United States Patent
Koike

(10) Patent No.: US 8,860,975 B2
(45) Date of Patent: Oct. 14, 2014

(54) PRINTING APPARATUS, METHOD FOR CONTROLLING THE PRINTING APPARATUS, AND STORAGE MEDIUM

(75) Inventor: Hisashi Koike, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 174 days.

(21) Appl. No.: 13/370,026

(22) Filed: Feb. 9, 2012

(65) Prior Publication Data

US 2012/0218587 A1 Aug. 30, 2012

(30) Foreign Application Priority Data

Feb. 24, 2011 (JP) ................... 2011-038010

(51) Int. Cl.
*G06F 3/12* (2006.01)
*G06K 9/00* (2006.01)
*G06K 15/00* (2006.01)
*H04N 1/32* (2006.01)
*H04N 1/00* (2006.01)
*B41J 29/38* (2006.01)
*B41J 29/46* (2006.01)

(52) U.S. Cl.
CPC . *B41J 29/38* (2013.01); *H04N 1/32* (2013.01); *G06F 3/121* (2013.01); *G06F 3/1234* (2013.01); *H04N 1/00* (2013.01); *G06F 3/1285* (2013.01); *B41J 29/46* (2013.01)

USPC .......................... 358/1.14; 358/1.15; 382/112

(58) Field of Classification Search
USPC ........................................................ 358/1.14
See application file for complete search history.

(56) References Cited

U.S. PATENT DOCUMENTS

| | | | | |
|---|---|---|---|---|
| 5,628,574 A | * | 5/1997 | Crowley | 400/621 |
| 2008/0259387 A1 | * | 10/2008 | Hirai | 358/1.15 |
| 2009/0279136 A1 | * | 11/2009 | Kanno | 358/1.15 |

FOREIGN PATENT DOCUMENTS

| JP | 2008-65447 A | 3/2008 |
|---|---|---|
| JP | 2009-75634 A | 4/2009 |

* cited by examiner

*Primary Examiner* — Marivelisse Santiago Cordero
*Assistant Examiner* — Moustapha Diaby
(74) *Attorney, Agent, or Firm* — Canon USA, Inc., IP Division

(57) ABSTRACT

A printing apparatus that can process, as a single job, a plurality of records each including a plurality of pages determines whether error information is included in an inspection result acquired from an inspection apparatus, before terminating print processing of each record. Then, if a job control unit determines that the error information is included, the printing apparatus does not perform print processing for a record that follows a print processing completed record and displays a print instruction screen that includes record information generated from the inspection result on a display unit.

9 Claims, 17 Drawing Sheets

PRINTING APPARATUS, METHOD FOR CONTROLLING THE PRINTING APPARATUS, AND STORAGE MEDIUM

BACKGROUND OF THE INVENTION

1. Field of the Invention

The present invention relates to a printing apparatus that performs print processing while causing an inspection apparatus to perform inspection processing, a method for controlling the printing apparatus, and a storage medium

2. Description of the Related Art

An inspection apparatus is conventionally used to check whether a printed product is correctly printed. More specifically, the inspection apparatus scans a printed product while it is conveyed along a predetermined path and determines whether the printed product is correctly printed based on a scan image. For example, an inspection system can be employed to inspect print results in an integrated manner. An in-line inspection printing system is conventionally used as a system operable in synchronization with a printing apparatus and capable of stopping the printing apparatus if a printed product is not correctly printed.

A printing system referred to as Variable Data Printing/Variable Data Publishing (VDP) is conventionally known. For example, the VDP system is usable to print direct mails by changing a part of contents to be printed according to each client or member.

In general, the VDP system performs printing by reading out variable information (e.g., address or the like) from a database and inserting the readout information in a layout prepared beforehand. For example, in some cases, the data to be inserted is limited to the address information only. In other cases, the data to be inserted may require a change of an image content included in the layout or paper to be used according to client or member information. Thus, the number of pages is variable depending on each client or member. In general, a VDP print job is a single job including many records.

As discussed in Japanese Patent Application Laid-Open No. 2008-65447, the conventional in-line inspection system detects the presence of a duplicate part, any lack, or white paper in a printed page by comparing a scan image of the printed page with a plurality of electronic original documents and requests reprinting when any error is detected.

Further, as discussed in Japanese Patent Application Laid-Open No. 2009-75634, it is conventionally known to generate variable print data including an error record automatically for reprint processing in the VDP print. Thus, the technique discussed in Japanese Patent Application Laid-Open No. 2009-75634 is usable to reprint only a record that includes an error page.

However, replacing only an error page with a correct one after completing the printing of a job entirely is a very difficult or complicated work regardless of the type (e.g., in-line or off-line) of the inspection system.

For example, according to the method discussed in Japanese Patent Application Laid-Open No. 2008-65447, reprinting is requested if an error is detected. However, the original printing is continued without any change. Therefore, it is difficult to find out an error page from a printed product.

Further, according to the method discussed in Japanese Patent Application Laid-Open No. 2009-75634, only an error record can be reprinted and therefore the replacement of records can be performed easily on a record-by-record basis. However, the method may not be so efficient because it takes a significant time to identify the position of the error record in the entire print result. In any method, if an operator makes a basic operational mistake, many pages or records may be printed erroneously while the entire printing operation is continued. Therefore, papers and toners are consumed uselessly.

SUMMARY OF THE INVENTION

The present invention relates to a system capable of performing reprint processing or continuous print processing on a record-by-record basis, according to an instruction from a user, in such a way as to reflect an inspection result obtained by an inspection apparatus.

According to an aspect of the present invention, a printing apparatus capable of processing, as a single job, a plurality of records each including a plurality of pages includes an acquisition unit configured to acquire an inspection result from an inspection apparatus that can inspect a print status by reading an image of paper printed by the printing apparatus, a printing unit configured to perform printing of print data generated from the job on a record-by-record basis, a determination unit configured to determine whether error information is included in an inspection result of a first record acquired by the acquisition unit from the inspection apparatus, before the printing unit terminates print processing of a second record, and a job control unit configured to control the printing unit to execute printing of all pages included in the second record without interrupting the presently performed printing of the second record, if the determination unit determines that error information is included in the inspection result of the first record, and further configured to prevent the printing unit from starting print processing for a third record that follows the second record.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

A printing apparatus capable of performing print processing while causing an inspection apparatus to perform inspection processing, a printing apparatus control method, and a related program are described in detail below.

<System Configuration>

Figure 1:
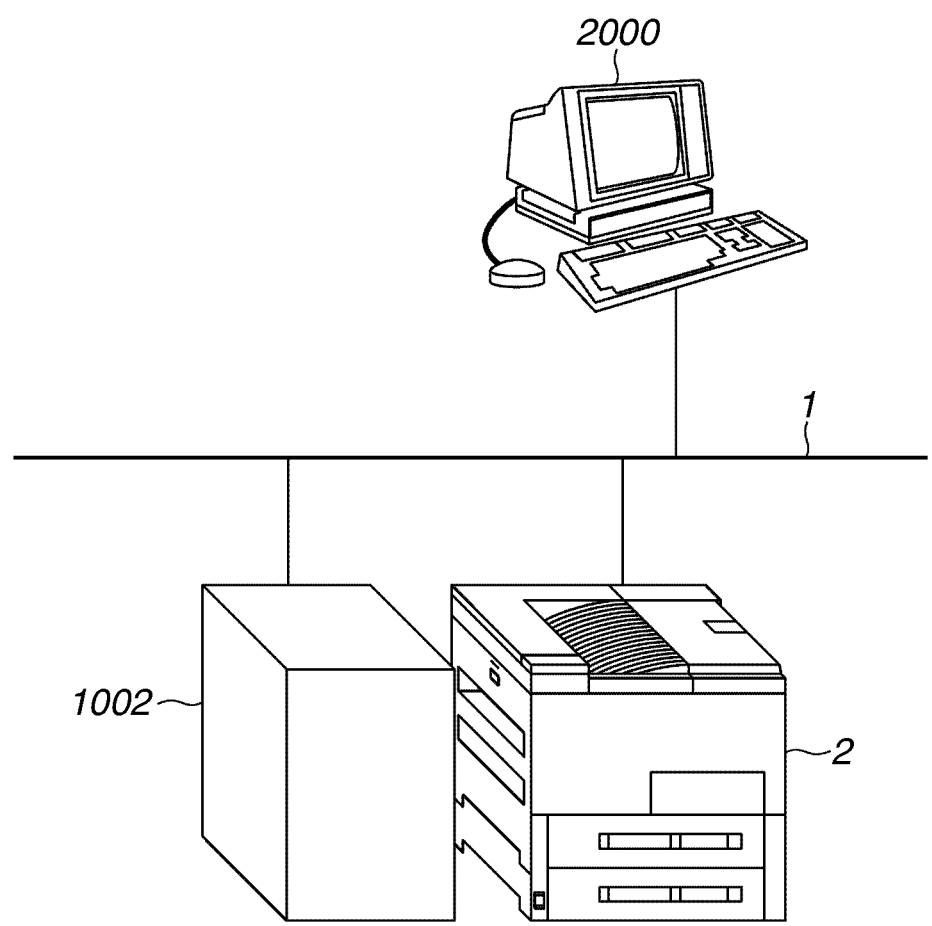
FIG. 1 schematically illustrates an example of a printing system according to an exemplary embodiment of the present invention.

FIG. 1 schematically illustrates an example of a printing system that includes a printing apparatus and an inspection apparatus according to an exemplary embodiment of the present invention. The printing apparatus according to the present exemplary embodiment can process, as a single job, a plurality of records each including a plurality of pages. For example, the printing apparatus according to the present exemplary embodiment is a multi-function peripheral having the above-described print processing function.

The printing system illustrated in FIG. 1 includes a host computer 2000 that can communicate with a printing apparatus 2 via a network 1. The printing system further includes an inspection apparatus 1002, which can execute functional processing for reading an image of paper discharged from the printing apparatus 2 and checking a print result. The inspection apparatus 1002 can transmit and receive information to and from the printing apparatus 2 via the network 1. The printing apparatus 2 can receive a job from the host computer 2000 and perform print processing on the record-by-record basis for print data generated from the received job.

The host computer 2000 transmits a job for executing the above-described VDP, which was generated by a print control program (e.g., Pro driver), to the printing apparatus 2.

Figure 2:
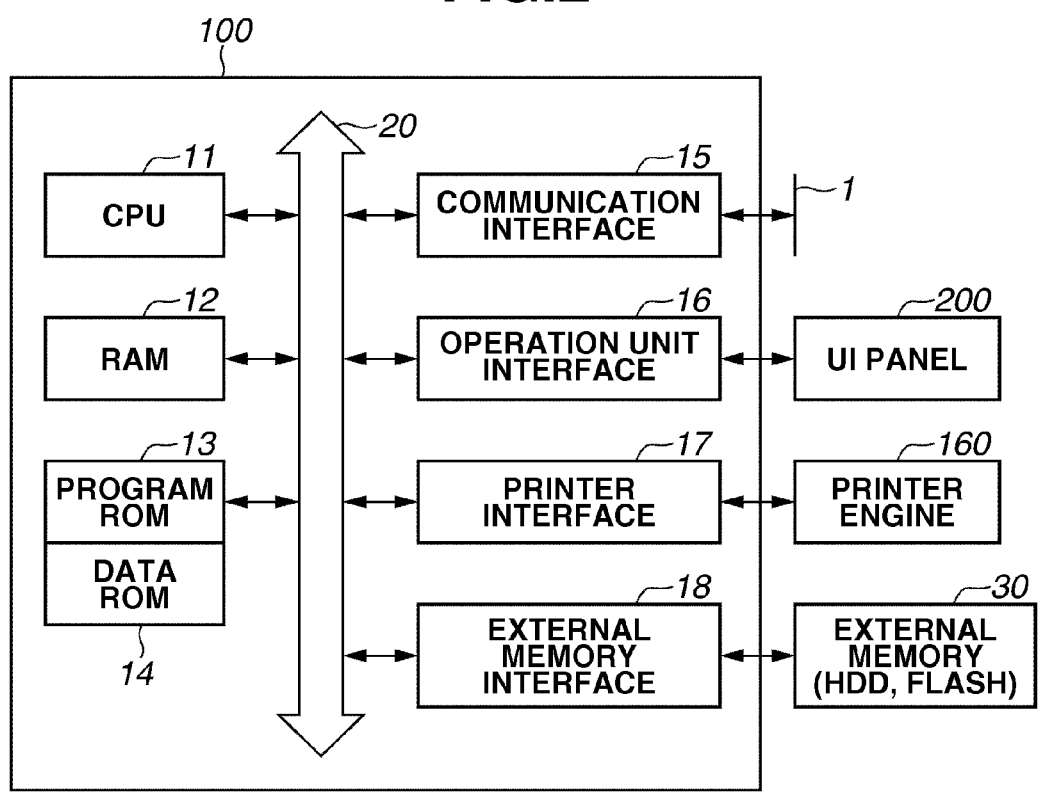
FIG. 2 is a block diagram illustrating a hardware configuration of a controller provided in a printing apparatus.

FIG. 2 is a block diagram illustrating a hardware configuration of a controller provided in the printing apparatus 2 illustrated in FIG. 1.

A controller 100 illustrated in FIG. 2 includes a central processing unit (CPU) 11, a random access memory (RAM) 12, a program read only memory (ROM) 13, and a data ROM 14. The CPU 11 can perform various operations based on programs stored in the program ROM 13. The RAM 12 is used as a main memory when the CPU 11 operates and a storage area that stores information temporarily. The data ROM 14 stores fixed information (e.g., font data) to be called when the program is executed.

The controller 100 includes a communication interface 15, an operation unit interface 16, a printer interface 17, and an external memory interface 18. The communication interface 15 can receive a job from the host computer 2000 via the network 1. The communication interface 15 can transmit and receive inspection information to and from the inspection apparatus 1002. The operation unit interface 16 connects the controller 100 to a UI panel 200.

The printer interface 17 connects the controller 100 to a printer engine 160. The external memory interface 18 connects the controller 100 to an external memory 30, such as a hard disk drive and a flash memory. The above-described devices 11 to 18 are mutually connected via a system bus 20.

Figure 3:
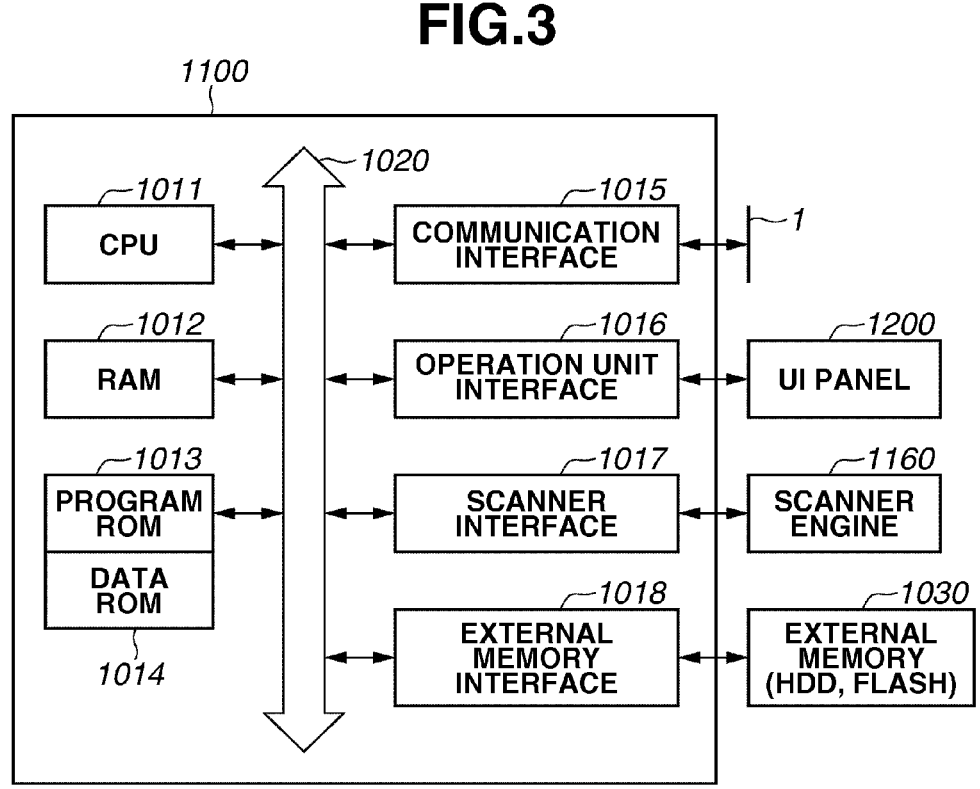
FIG. 3 is a block diagram illustrating a hardware configuration of a controller provided in an inspection apparatus.

FIG. 3 is a block diagram illustrating a hardware configuration of a controller provided in the inspection apparatus 1002 illustrated in FIG. 1.

A controller 1100 illustrated in FIG. 3 includes a CPU 1011, a RAM 1012, a program ROM 1013, and a data ROM 1014. The CPU 1011 can perform various operations based on programs stored in the program ROM 1013. The RAM 1012 is used as a main memory when the CPU 1011 operates and a storage area that stores information temporarily. The data ROM 1014 stores fixed information (e.g., character font collation data and barcode information) to be called when the program is executed.

The controller 1100 further includes a communication interface 1015, an operation unit interface 1016, a scanner interface 1017, and an external memory interface 1018. The communication interface 1015 is connected to the network 1 and can transmit and receive inspection information to and from the printing apparatus 2. The operation unit interface 1016 connects the controller 1100 to a UI panel 1200.

The scanner interface 1017 connects the controller 1100 to a scanner engine 1160. The external memory interface 1018 connects the controller 1100 to an external memory, such as a hard disk drive and a flash memory. The above-described devices 1011 to 1018 are mutually connected via a system bus 1020.

Figure 4:
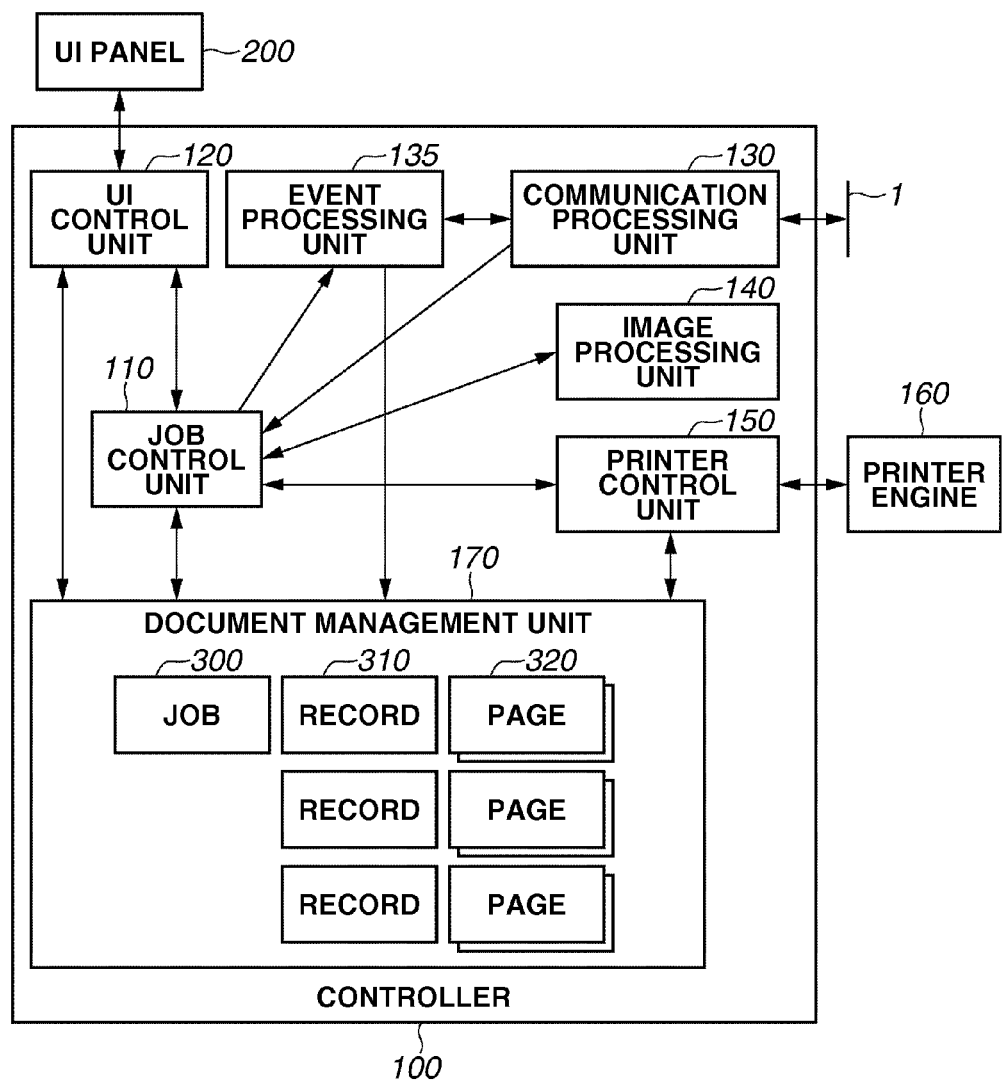
FIG. 4 is a block diagram illustrating a software configuration of the controller illustrated in FIG. 2.

FIG. 4 is a block diagram illustrating a correspondence between a software configuration of the controller 100 provided in the printing apparatus 2 illustrated in FIG. 1 and its peripheral device.

The controller 100 illustrated in FIG. 4 includes a job control unit 110, a UI control unit 120, and a communication processing unit 130. The UI control unit 120 controls the operation unit interface 16 to communicate with the UI panel 200. The communication processing unit 130 can control the communication interface 15. The job control unit 110 is configured to acquire an inspection result notified from the inspection apparatus 1002 that inspects a print status by reading an image of paper printed by the printing apparatus 2.

The controller 100 further includes an event processing unit 135, an image processing unit 140, a printer control unit 150, and a document management unit 170. The event processing unit 135 can process an inspection result event received from the communication processing unit 130 and a page correction event received from the job control unit 110. The image processing unit 140 can generate an image of each page of a job. The printer control unit 150 can control the printer interface 17. The printer control unit 150 can control a printer engine 160 via the printer interface 17.

The document management unit 170 stores job information received from the host computer 2000. The document management unit 170 stores a job 300 which includes a plurality of records 310 and a plurality of pages 320.

The above-described job 300, records 310, and pages 320 are stored on the external memory 30 illustrated in FIG. 2 and managed by the document management unit 170. Further, the CPU 11 executes each program stored in the program ROM 13 to realize the controls by the job control unit 110, the UI control unit 120, the communication processing unit 130, the event processing unit 135, the image processing unit 140, and the printer control unit 150 as well as the management processing by the document management unit 170.

Figure 5:
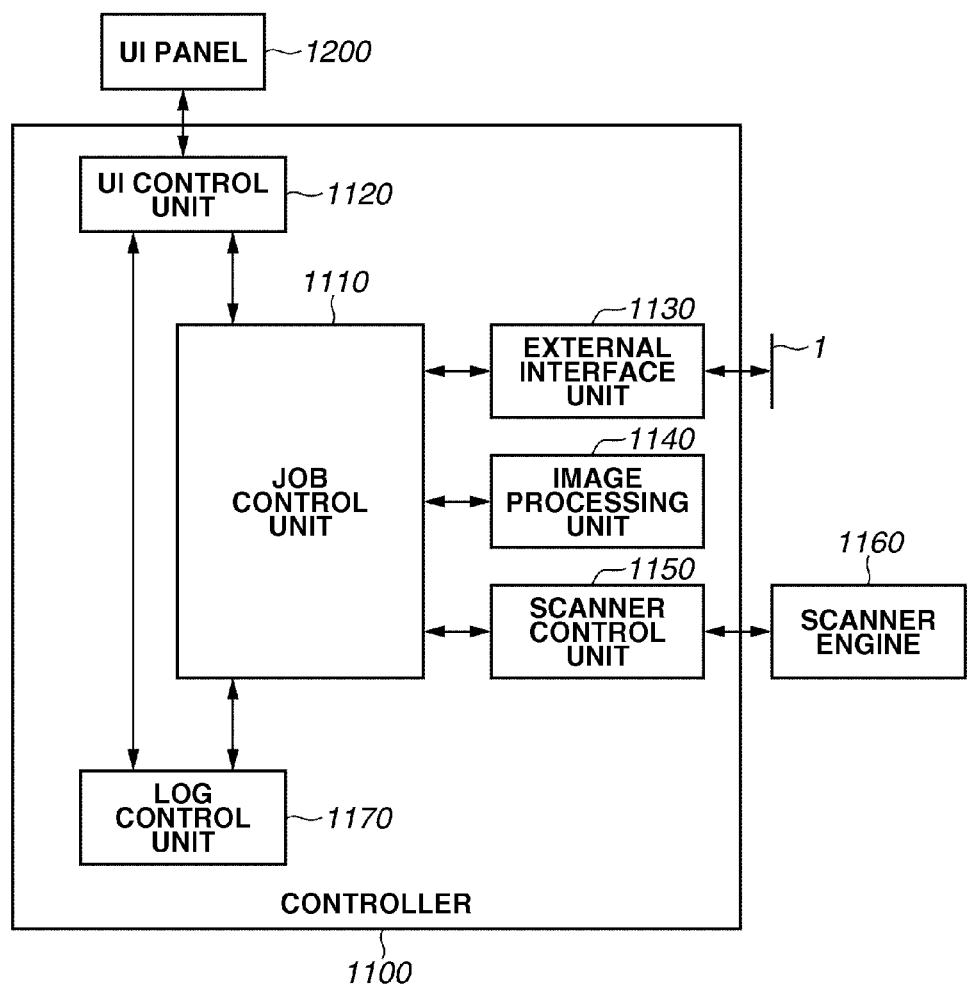
FIG. 5 schematically illustrates a configuration of the controller provided in the inspection apparatus illustrated in FIG. 1.

FIG. 5 schematically illustrates a software block diagram of a controller provided in the inspection apparatus 1002 illustrated in FIG. 1 and its peripheral configuration.

The controller 1100 illustrated in FIG. 5 includes a job control unit 1110 that can control a UI control unit 1120, a log control unit 1170, a scanner control unit 1150, an image processing unit 1140, and a communication processing unit 1130. The UI control unit 1120 can control the operation unit interface 1016 to communicate with the UI panel 1200. The communication processing unit 1130 can control the communication interface 1015.

The image processing unit 1140 can perform inspection determination on a read (or scanned) image. The scanner control unit 1150 can control the scanner interface 1017. The scanner control unit 1150 can control the scanner engine 1160 via the scanner interface 1017.

The log control unit 1170 stores log information indicating an inspection result.

The CPU 1011 executes the programs stored in the program ROM 1013 to realize the controls to be performed by the devices 1110, 1120, 1130, 1140, and 1150 and the processing to be performed by the log control unit 1170.

Figure 6:
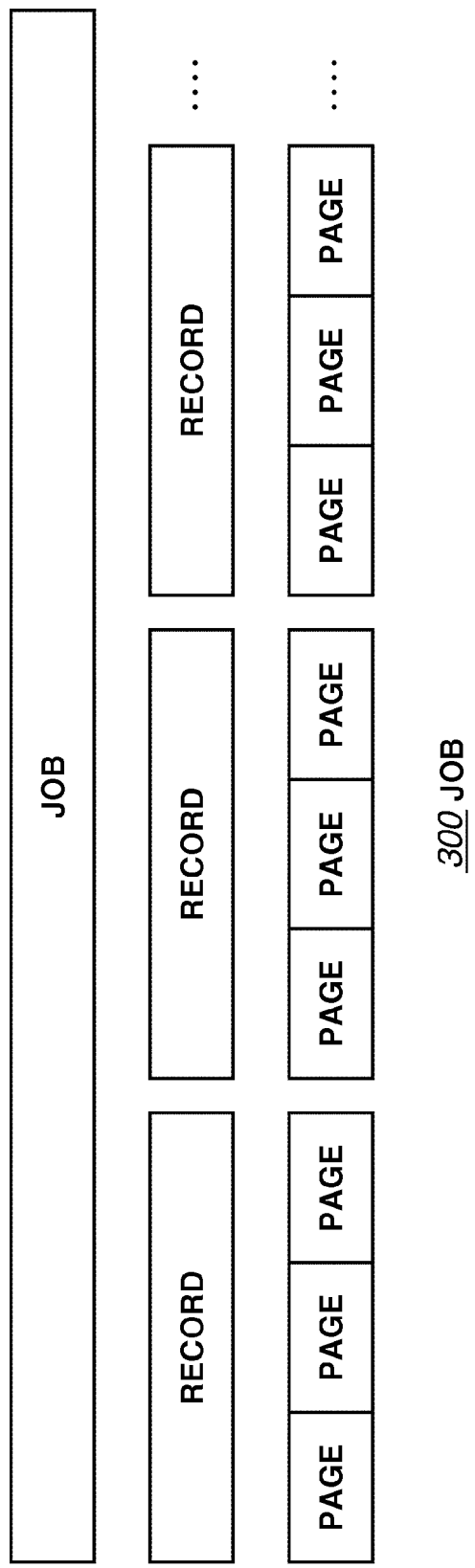
FIG. 6 illustrates an example internal configuration of a job in a document management unit illustrated in FIG. 4.

FIG. 6 illustrates an example internal configuration of the job 300 in the document management unit 170 illustrated in FIG. 4. In FIG. 6, the job 300 includes information relating to a single record or a plurality of records. Each record includes information relating to a single page or a plurality of pages.

Figure 7:
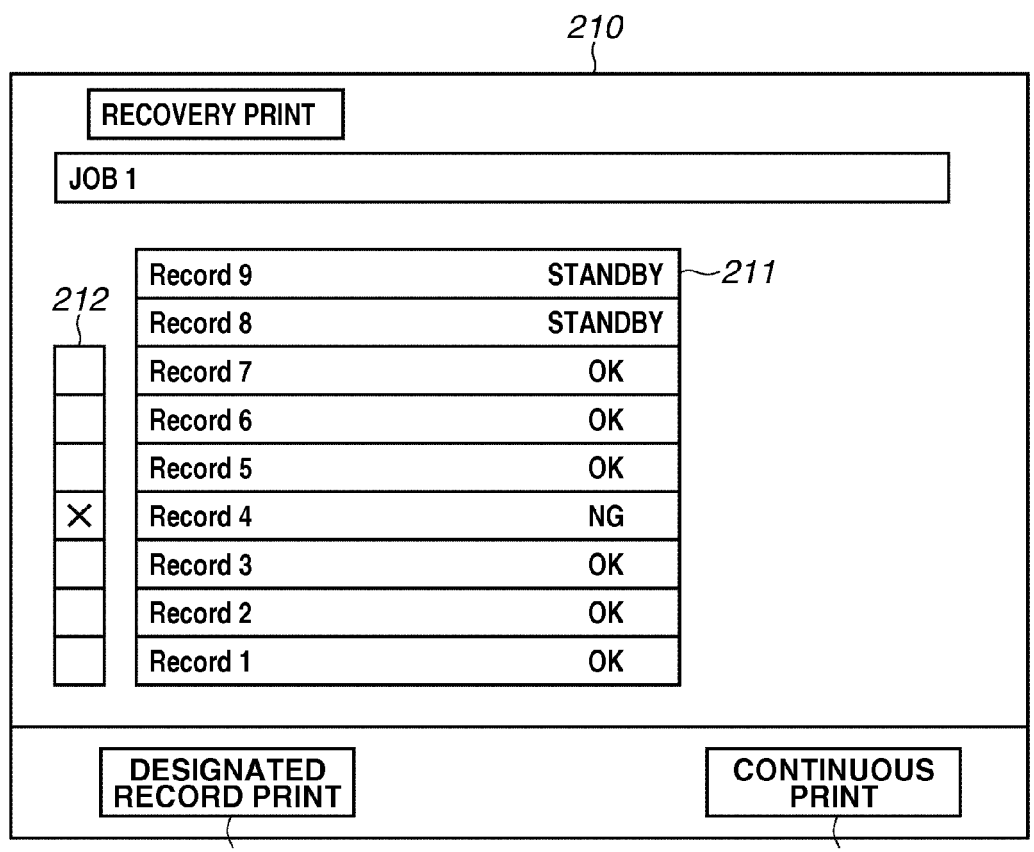
FIG. 7 illustrates an example user interface (UI) displayed on a UI panel illustrated in FIG. 3.

FIG. 7 illustrates an example user interface (UI) to be displayed on the UI panel 200 illustrated in FIG. 2. The screen illustrated in FIG. 7 is an example of a recovery print operation screen 210 to be displayed on the UI panel 200. The screen illustrated in FIG. 7 is configured to be displayed on a printing apparatus management screen of the host computer 2000 that executes a web application, and also can be configured to receive a print instruction, which is described below, input via the host computer 2000.

The recovery print operation screen 210 illustrated in FIG. 7 includes a list 211 of records included in a job, which is displayed on the UI panel 200. In the present exemplary embodiment, the recovery print operation screen 210 displays how many records are there after an error page output to a presently stooped record. The recovery print operation screen 210 can also display the output state of any normal page or any error page for subsequent records.

The recovery print operation screen 210 further includes a check box 212 that enables a user to set a recovery target record. In addition, the recovery print operation screen 210 includes a designated record print button 213 that enables a user to instruct printing of the record set on the recovery print operation screen 210. In the present exemplary embodiment, the designated record print button 213 functions as a button for receiving a reprint request input by the user for the record selected by the check box 212.

The recovery print operation screen 210 further includes a continuous print button 214 that enables a user to instruct a continuous print after completing the recovery print. In the present exemplary embodiment, the job control unit 110 accepts the instruction of the continuous print button 214 via a print instruction screen displayed on a display unit. If the user presses the continuous print button 214 on the print instruction screen, the job control unit 110 accepts a continuous print request for subsequent records that follow the printing stopped record. More specifically, if the user presses the continuous print button 214 via the print instruction screen illustrated in FIG. 7, the job control unit 110 accepts the continuous print request for a record 8 and subsequent records.

According to the present exemplary embodiment, it is feasible to improve the usability flexibly when the number of pages included in each record is not constant, or when it is required to prevent the printing performance from deteriorating.

Figure 8:
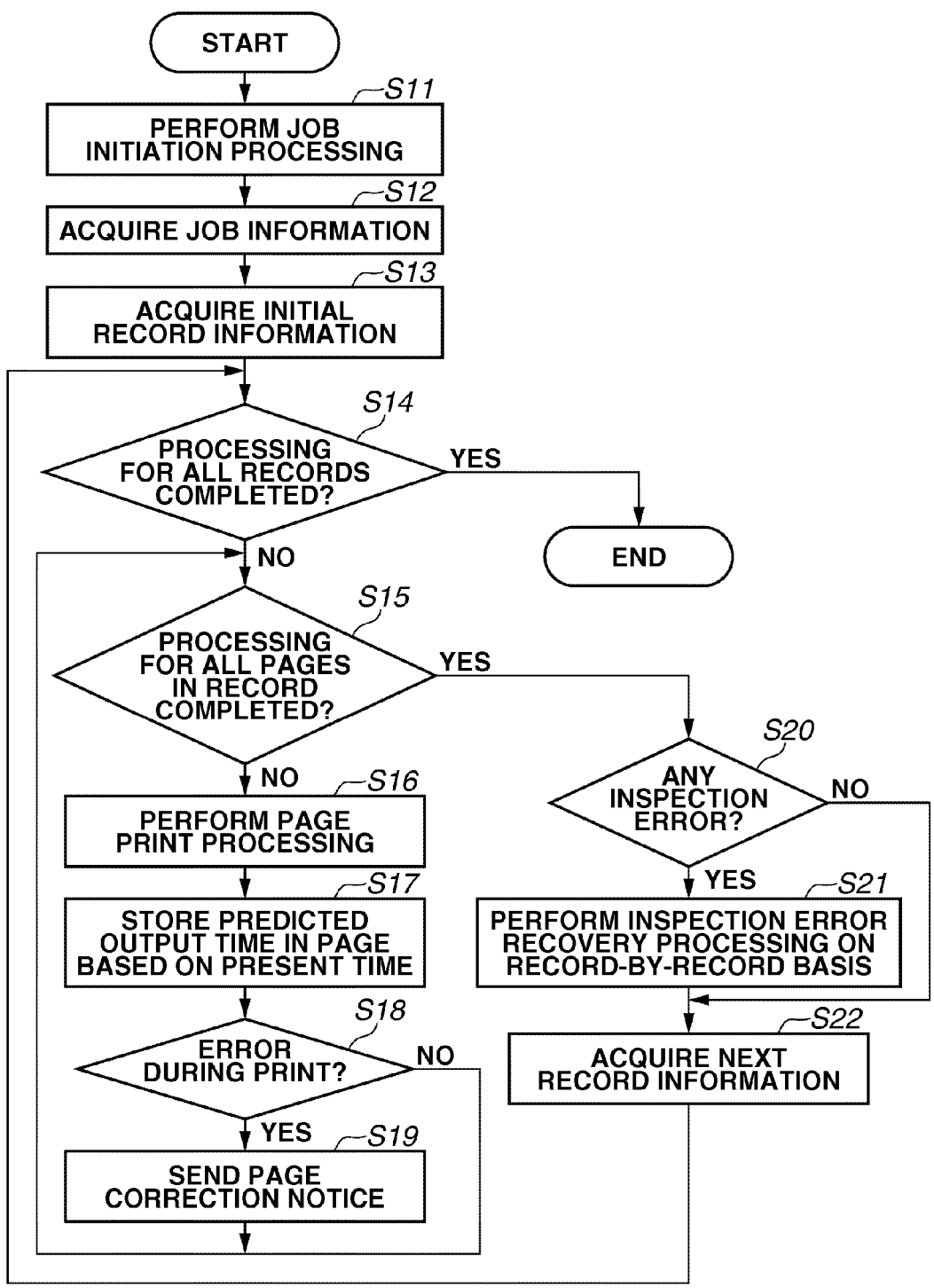
FIG. 8 is a flowchart illustrating a control method for the printing apparatus according to the exemplary embodiment.

FIG. 8 is a flowchart illustrating a control method of the printing apparatus according to the present exemplary embodiment. More specifically, FIG. 8 illustrates an example of job print processing performed by the job control unit 110 of the controller 100 provided in the printing apparatus 2 illustrated in FIG. 1. The job control unit 110 includes the CPU 11, the RAM 12, the program ROM 13, and the data ROM 14.

The procedure of each step is stored in the program ROM 13 of the job control unit 110 so that the CPU 11 can execute the processing of each step. Normal print processing performed by the CPU 11 is described below with reference to the illustrations in FIG. 1, FIG. 2, FIG. 4, and FIG. 6 and the flowchart illustrated in FIG. 8.

[Normal Print Processing]

If the host computer 2000 transmits a job, the job control unit 110 receives the job via the network 1 and the communication processing unit 130. If the job control unit 110 recognizes the reception of the job, first in step S11, the job control unit 110 notifies the event processing unit 135 of a job initiation.

Then, in step S12, the job control unit 110 reads job information and stores the job information in the document management unit 170. In step S13, the job control unit 110 reads record information from the job information and starts processing for a record.

In the present exemplary embodiment, the job control unit 110 determines whether the processing for all records has been completed. If it is determined that at least one record remains (NO in step S14), then in step S15, the job control unit 110 determines whether the processing for all pages included in the present record has been completed. If the job control unit 110 determines that the processing for all pages has not been completed (NO in step S15), the processing proceeds to step S16.

Then, in step S16, the job control unit 110 executes page processing. The job control unit 110 controls the image processing unit 140 to perform image processing and requests the printer control unit 150 to print the page.

Next, if the printer control unit 150 starts the page printing, then in step S17, the job control unit 110 predicts time when paper including the page is discharged, based on the present time, and stores the predicted time on the page 320 of the document management unit 170.

Then, in step S18, the job control unit 110 determines whether any print error has occurred in the job due to jam or the like after starting the printing, based on information obtainable from various sensors. If it is determined that no print error has occurred, for example, when the page is discharged normally without any error, the job control unit 110 does not execute any processing (NO in step S18). Then, the processing returns to step S15.

On the other hand, if the job control unit 110 determines that an error has occurred during the print processing, the number of pages actually discharged may exceed the designated number.

If it is determined that such an error has occurred during the print processing (YES in step S18), then in step S19, the job control unit 110 sends a page correction notice event to the event processing unit 135. The page correction notice event indicates the number of duplicate pages. Then, the processing returns to step S15.

Then, the processing returns to step S15. The job control unit 110 repeats the processing of step S16 to step S19 until the processing completes thoroughly for all pages included in the record.

If the job control unit 110 determines that the record processing has completed (YES in step S15), the processing proceeds to step S20.

Then, in step S20, the job control unit 110 determines whether the page information managed by the document management unit 170 includes an inspection error having been detected. If the job control unit 110 determines that an inspection error having been detected is included in the page information managed by the document management unit 170 (YES in step S20), then in step S21, the job control unit 110 performs inspection error recovery processing on the record-by-record basis.

On the other hand, if the job control unit 110 determines that no inspection error has been detected (NO in step S20), the processing proceeds to step S22. In step S22, the job control unit 110 acquires next record information. Then, the processing returns to step S14 to repeats the above-described processing.

If the job control unit 110 determines that the processing for all records has been completed (YES in step S14), the job control unit 110 terminates the job print processing illustrated in FIG. 8.

In the present exemplary embodiment, at the inspection error confirmation timing in step S20 illustrated in FIG. 8, the confirmed inspection error is a determination result for the record determined previously as YES in step S15 and conveyed to the inspection apparatus 1002, not for the record determined presently as YES in step S15. In other words, the printing system performs the inspection error processing for the already printed record and the print processing for the next record in a parallel fashion. Therefore, the record to be stopped in response to the inspection error is the next record determined as YES in step S15.

Further, the processing in step S20 is for checking an inspection result obtainable from the inspection apparatus 1002 before completing the print processing of each record. However, the job control unit 110 can be configured to check the inspection result of the inspection apparatus 1002 before the print processing is completed for each of a plurality of records. In the present exemplary embodiment, the number N of a plurality of records (N records) can be a fixed value or may be a variable value that can be set appropriately according to user's print processing environment.

More specifically, before the job control unit 110 completes the print processing for the plurality of records, the job control unit 110 can determine whether error information is included in the inspection result acquired from the inspection apparatus 1002 and control both the reprint processing and the continuous print processing based on the determination result.

Further, if an engine capable of causing the printing apparatus 2 to perform print processing speedily is available, the above-described processing may deteriorate printing performance.

Hence, the processing includes an additional process to detect a record break position that is nearest from a record for which the printing apparatus 2 is currently executing print processing and at which the printing apparatus 2 can stop the print processing, if the job control unit 110 determines that the inspection result acquired from the inspection apparatus 1002 includes the error information. Then, the job control unit 110 receives a continuous print request for the record that corresponds to the record break position detected in the above-described process.

Further, in this case, the job control unit 110 can perform determination in a comprehensive way considering the following pause conditions.

(1) Stop the print processing if the inspection apparatus 1002 has already detected an error at the time when the print of the head page of a record starts.

(2) Stop the print processing at an intermediate page and discard the remaining pages if the number of error detected records is two or more, even when the printing apparatus 2 is currently performing page print processing for any one of the records.

(3) Stop the print processing for the remaining pages after outputting a predetermined number of pages if a plurality of errors is detected in the same record.

<Recovery Print Processing>

Figure 9:
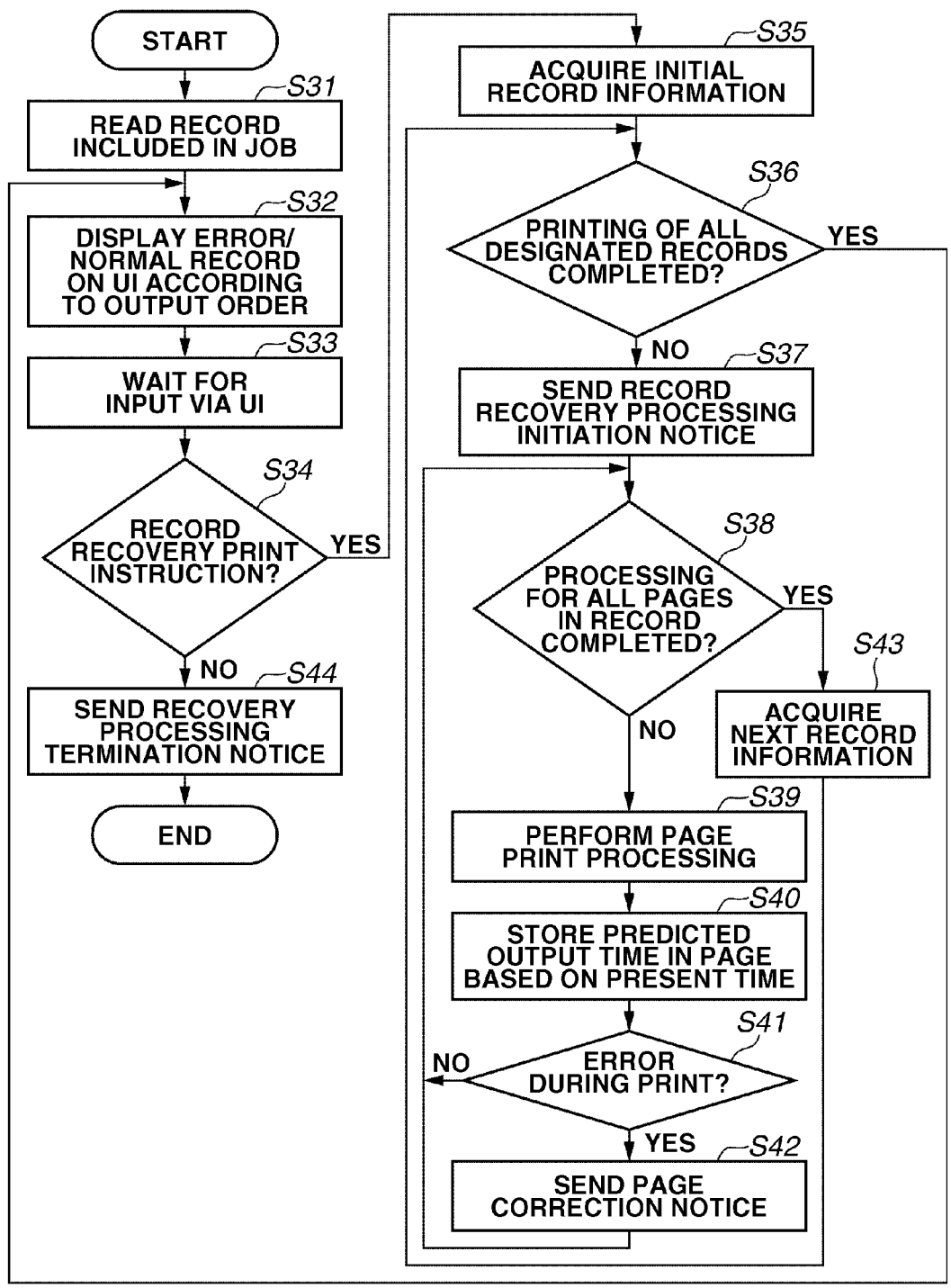
FIG. 9 is a flowchart illustrating a control method for the printing apparatus according to the exemplary embodiment.

FIG. 9 is a flowchart illustrating a control method of the printing apparatus according to the present exemplary embodiment. More specifically, FIG. 9 illustrates a detailed procedure of inspection error recovery print processing that can be performed by the job control unit 110 provided in the controller 100 of the printing apparatus 2 illustrated in FIG. 1, i.e., the processing to be performed on the record-by-record basis in step S21 illustrated in FIG. 8.

An example of the recovery print processing to be performed when an inspection error occurs is described below with reference to the illustrations in FIG. 1, FIG. 2, FIG. 4, FIG. 6, and FIG. 7 and the flowchart in FIG. 9. The procedure of each step is stored in the program ROM 13 of the job control unit 110 so that the CPU 11 can execute the processing of each step.

In the present exemplary embodiment, if the job control unit 110 determines that the inspection result includes the error information, the job control unit 110 causes the printing apparatus 2 to stop print processing for a subsequent record that follows the record whose print processing has been completed by the printing apparatus 2. In this case, the job control unit 110 performs control for displaying the print instruction screen on the display unit. The print instruction screen to be displayed in this case includes record information that can be generated based on an inspection result acquired from the inspection apparatus 1002.

In step S21 illustrated in FIG. 8, if the job control unit 110 determines that the inspection error has occurred, first in step S31, the job control unit 110 reads job, record, and page information from the document management unit 170.

Then, the job control unit 110 causes the UI control unit 120 to display inspection result information for each record on the UI panel 200. FIG. 7 illustrates the list 211 of error record/normal record information according to an output order.

Next, in step S33, the job control unit 110 waits for an instruction that may be input by a user while the user checks the UI content displayed on the UI panel 200. In the present exemplary embodiment, the user can confirm that the output of records 1 to 7 is already completed and printing of record 8 and subsequent records are temporarily stopped (i.e., in a job processing standby state), and further an error has occurred in any one of the pages included in record 4, with reference to the display content of the UI panel 200.

For example, the user selects the record 4 in the check box 212 displayed on the UI 210, and presses the designated record print button 213. In this case, in step S34, the job control unit 110 determines whether a recovery print instruction has been received via the UI control unit 120. If the job control unit 110 determines that the recovery print instruction has been received via the UI control unit 120 (YES in step S34), the processing proceeds to step S35.

In step S35, the job control unit 110 acquires initial record information. Subsequently, in step S36, the job control unit 110 determines whether the printing of all designated records has been completed. If the job control unit 110 determines that the printing of all designated records has been completed (YES in step S36), the processing returns to step S32. On the other hand, if the job control unit 110 determines that the printing of all designated records is not yet completed (NO in step S36), the processing proceeds to step S37. In step S37, to start recovery print processing for the record to be reprinted, the job control unit 110 sends a recovery print processing initiation notice to the event processing unit 135.

Then, in step S38, the job control unit 110 determines whether the processing for all pages included in the record has been completed. If the job control unit 110 determines that the processing for all pages is not yet completed (NO in step S38), the processing proceeds to step S39. In step S39, the job control unit 110 controls both the image processing unit 140 and the printer control unit 150 to perform page print processing.

Then, in step S40, the job control unit 110 predicts the output time of the paper including the target page, when the page print processing has been started, based on the present time, and stores the predicted time on the page 320 of the document management unit 170.

Then, in step S41, the job control unit 110 determines whether any print error has occurred in the job due to jam or the like after starting the print processing, based on information obtainable from various sensors. If it is determined that no print error has occurred (NO in step S41), for example, when the page is discharged normally without any error, the job control unit 110 does not execute any processing. Then, the processing returns to step S38.

On the other hand, if the job control unit 110 determines that a print error has occurred during the print processing (YES in step S41), then in step S42, the job control unit 110 sends a page correction notice event to the event processing unit 135. The page correction notice event indicates the number of duplicate pages. Then, the processing returns to step S38.

If the job control unit 110 determines that the printing of all pages included in the record has been completed (YES in step S38), the processing proceeds to step S43. Then, in step S43, the job control unit 110 acquires the next record information from the document management unit 170. Then, the processing returns to step S36 to repeat similar processing.

If the job control unit 110 determines that the recovery print processing for the designated record has been completed thoroughly (YES in step S36), the processing returns to step S32. In step S32, the job control unit 110 causes the UI control unit 120 to display the status of the record again on the UI panel 200 based on the present job information.

If the user confirms an error again, the user can instruct the printing system to perform the recovery print processing repetitively. As described above, at the time when no error remains, the user can easily replace the error-containing output with an output result of the recovery printed record.

Subsequently, if the job control unit 110 determines that the user has pressed the continuous print button 214 on the UI screen illustrated in FIG. 7, the processing proceeds from step S34 to step S44. Then, the job control unit 110 notifies the event processing unit 135 of recovery print processing completion and terminates the recovery print processing.

<Output Time Prediction Processing>

Figure 10:
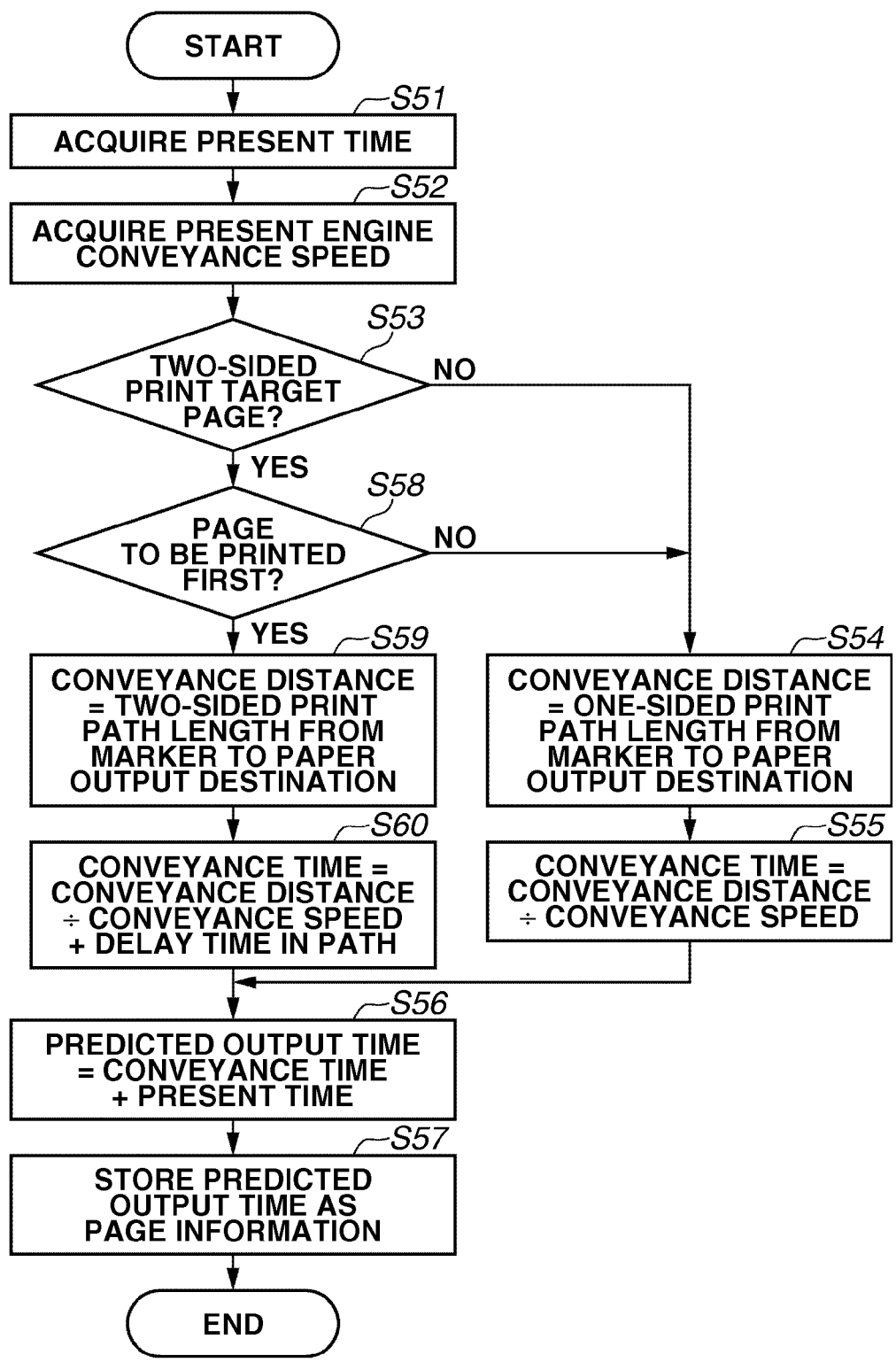
FIG. 10 is a flowchart illustrating a control method for the printing apparatus according to the exemplary embodiment.

FIG. 10 is a flowchart illustrating a control method of the printing apparatus according to the present exemplary embodiment. More specifically, FIG. 10 illustrates a detailed procedure of output time prediction processing (i.e., the processing in step S40) that can be performed by the job control unit 110 of the controller 100 provided in the printing apparatus 2 illustrated in FIG. 1.

An example of the output time prediction processing is described below with reference to the illustrations in FIG. 1, FIG. 2, FIG. 4, FIG. 6, and FIG. 7 and the flowchart in FIG. 10. The procedure of each step is stored in the program ROM 13 of the job control unit 110 so that the CPU 11 can execute the processing of each step.

First, in step S51, the job control unit 110 acquires present time from the OS. In step S52, the job control unit 110 acquires the paper conveyance speed of the present engine.

Then, in step S53, the job control unit 110 determines whether the page to be printed is a two-sided print target. If the job control unit 110 determines that the page to be printed is the two-sided print target (YES in step S53), the processing proceeds to step S58.

On the other hand, if the job control unit 110 determines that the page to be printed is not the two-sided print target (NO in step S53), then in step S54, the job control unit 110 determines that the conveyance distance is equal to the one-sided print path length, that is the distance from a marker to a paper output destination.

Then, in step S55, the job control unit 110 calculates the conveyance time by dividing the distance obtained in step S54 by the conveyance speed obtained in step S52.

In step S56, the job control unit 110 calculates the predicted output time by adding the conveyance time to the present time obtained in step S51. In step S57, the job control unit 110 writes the obtained information to the corresponding page of the corresponding record in the document management unit 170. Then, the job control unit 110 terminates the processing of the flowchart illustrated in FIG. 10.

On the other hand, if the job control unit 110 determines that the page to be printed is the two-sided print target (YES in step S53), then in step S58, the job control unit 110 determines whether the page to be printed is to be printed first or second.

If the job control unit 110 determines that the page to be printed is printed second (NO in step S58), the job control unit 110 performs the above-described processing in step S54.

On the other hand, if the job control unit 110 determines that the page to be printed is printed first (YES in step S58), the processing proceeds to step S59.

In step S59, the job control unit 110 determines that the conveyance distance is equal to the two-sided print path length, that is the distance from the marker to the paper output destination via a route connecting a two-sided reversing unit, a reversing paper feeding path, and the marker (again).

Next, in step S60, the job control unit 110 calculates the conveyance time by dividing the distance obtained in step S59 by the conveyance speed obtained in step S52.

In step S56, the job control unit 110 calculates the predicted output time by adding the conveyance time to the present time obtained in step S51. In step S57, the job control unit 110 writes the obtained information to the corresponding page of the corresponding record in the document management unit 170. Then, the job control unit 110 terminates the processing of the flowchart illustrated in FIG. 10.

<Event Processing>

Figure 11:
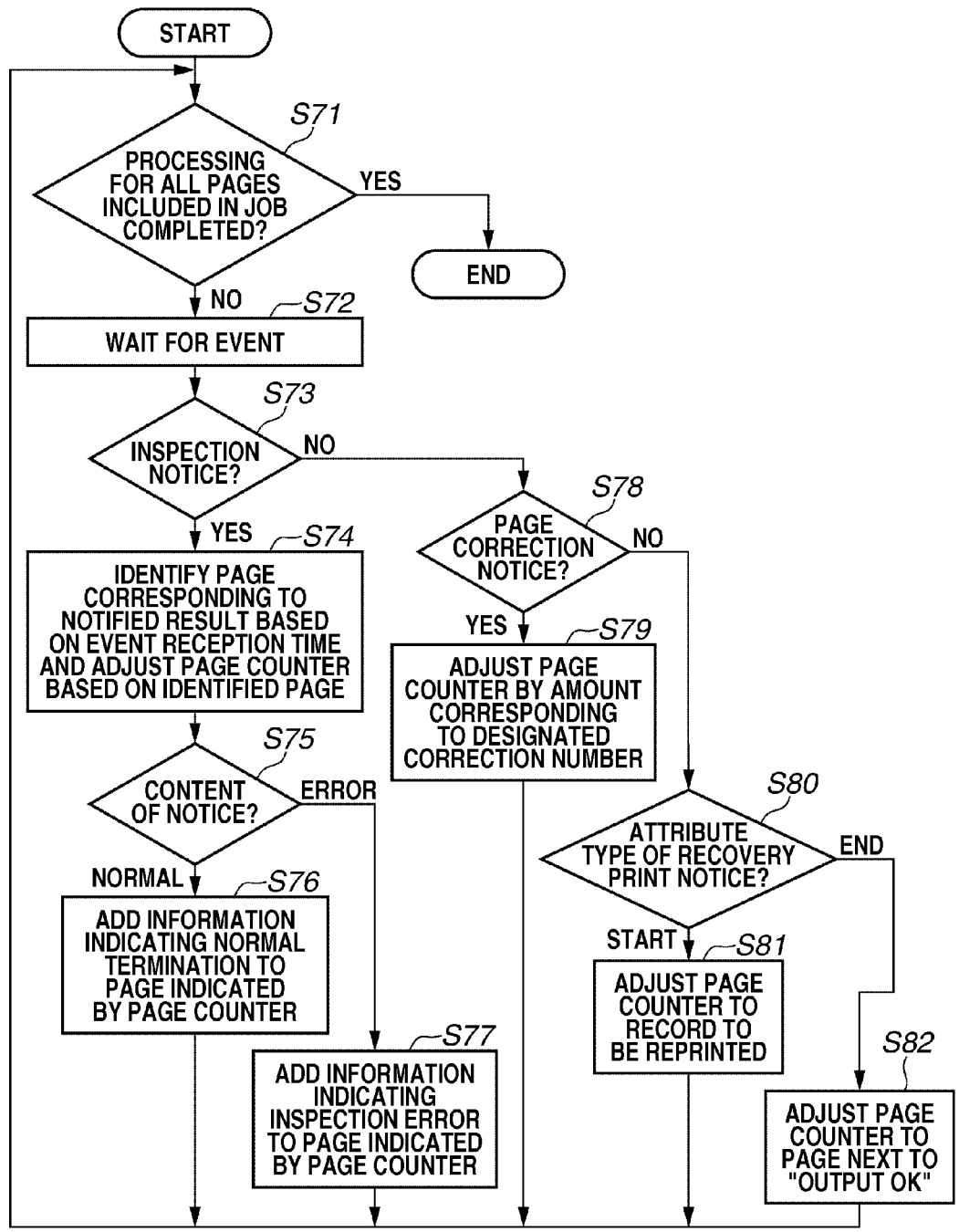
FIG. 11 is a flowchart illustrating a control method for the printing apparatus according to the exemplary embodiment.

FIG. 11 is a flowchart illustrating a control method of the printing apparatus according to the present exemplary embodiment. More specifically, FIG. 11 illustrates an event processing procedure of each job, which can be performed by the event processing unit 135 of the controller 100 provided in the printing apparatus 2 illustrated in FIG. 1.

An example of the event processing is described below with reference to the illustrations in FIG. 1, FIG. 2, FIG. 4, FIG. 8, and FIG. 9 and the flowchart in FIG. 11. The procedure of each step is stored in the program ROM 13 of the event processing unit 135 so that the CPU 11 can execute the processing of each step.

If the job control unit 110 starts the print job in step S11 illustrated in FIG. 8, the event processing unit 135 starts event processing for each job.

In step S71, the event processing unit 135 determines whether the processing for all pages included in the job managed by the document management unit 170 has been completed. If the event processing unit 135 determines that the processing for all pages of the job is not yet completed (NO in step S71), then in step S72, the event processing unit 135 waits for a job event.

Then, in step S73, the event processing unit 135 determines whether the received event is an inspection notice from the inspection apparatus 1002. If the event processing unit 135 determines that the received event is the inspection notice (YES in step S73), the processing proceeds to step S74.

Then, in step S74, the event processing unit 135 identifies the page of the job that corresponds to the notified event with reference to event reception time. Since predicted paper output time is written beforehand on each page, the event processing unit 135 can identify the corresponding page by comparing the event reception time with the predicted paper output time.

The event from the inspection apparatus 1002 includes the page number counted after the inspection apparatus 1002 is activated. However, the page number included in the event is not always identical to the order of the page printed by the printing apparatus 2. Therefore, it is necessary to change the event in such a way as to correctly identify the page stored in the printing apparatus 2. Hence, after the correction of the page counter in step S74, the event processing unit 135 stores the corrected value in the page counter indicating the discharge (output) order.

Next, in step S75, the event processing unit 135 determines whether the content of the event notice indicates that the inspection result is normal.

If the event processing unit 135 determines that the content of the event notice indicates that the inspection result is normal (NORMAL in step S75), then in step S76, the event processing unit 135 adds information indicating normal termination to the page corresponding to the page counter. Subsequently, the processing returns to step S71.

On the other hand, if the event processing unit 135 determines that the content of the event notice indicates that the inspection result is error (ERROR in step S75), then in step S77, the event processing unit 135 adds information indicating inspection error to the page corresponding to the page counter. Subsequently, the processing returns to step S71 in which the event processing unit 135 waits for the next event.

On the other hand, if the event processing unit 135 determines that the notified event is not the inspection notice (NO in step S73), then in step S78, the event processing unit 135 determines whether the notified event is the page correction notice received from the job control unit 110.

If the event processing unit 135 determines that the notified event is the page correction notice (YES in step S78), then in step S79, the event processing unit 135 adjusts the page counter by an amount corresponding to a designated correction number. Subsequently, the processing returns to step S71.

On the other hand, if the event processing unit 135 determines that the notified event is not the page correction notice (NO in step S78), then in step S80, the event processing unit 135 determines whether the notified event is a recovery print initiation notice or a recovery print termination notice.

If the event processing unit 135 determines that the attribute of the notified event indicates initiation of the recovery print (START in step S80), then in step S81, the event processing unit 135 adjusts the page counter in such a way as to coincide with the head position of the record to be subjected to the recovery print. Subsequently, the processing returns to step S71.

On the other hand, if the event processing unit 135 determines that the attribute of the notified event indicates termination of the recovery print (END in step S80), then in step S82, the event processing unit 135 adjusts the page counter in such a way as to coincide with the page following the finally output page. Then, the processing proceeds to step S71.

In step S71, if the event processing unit 135 determines that the print processing of the job has been completed (YES in step S71), the event processing unit 135 terminates the event processing illustrated in FIG. 11.

<Inspection Processing>

Figure 12:
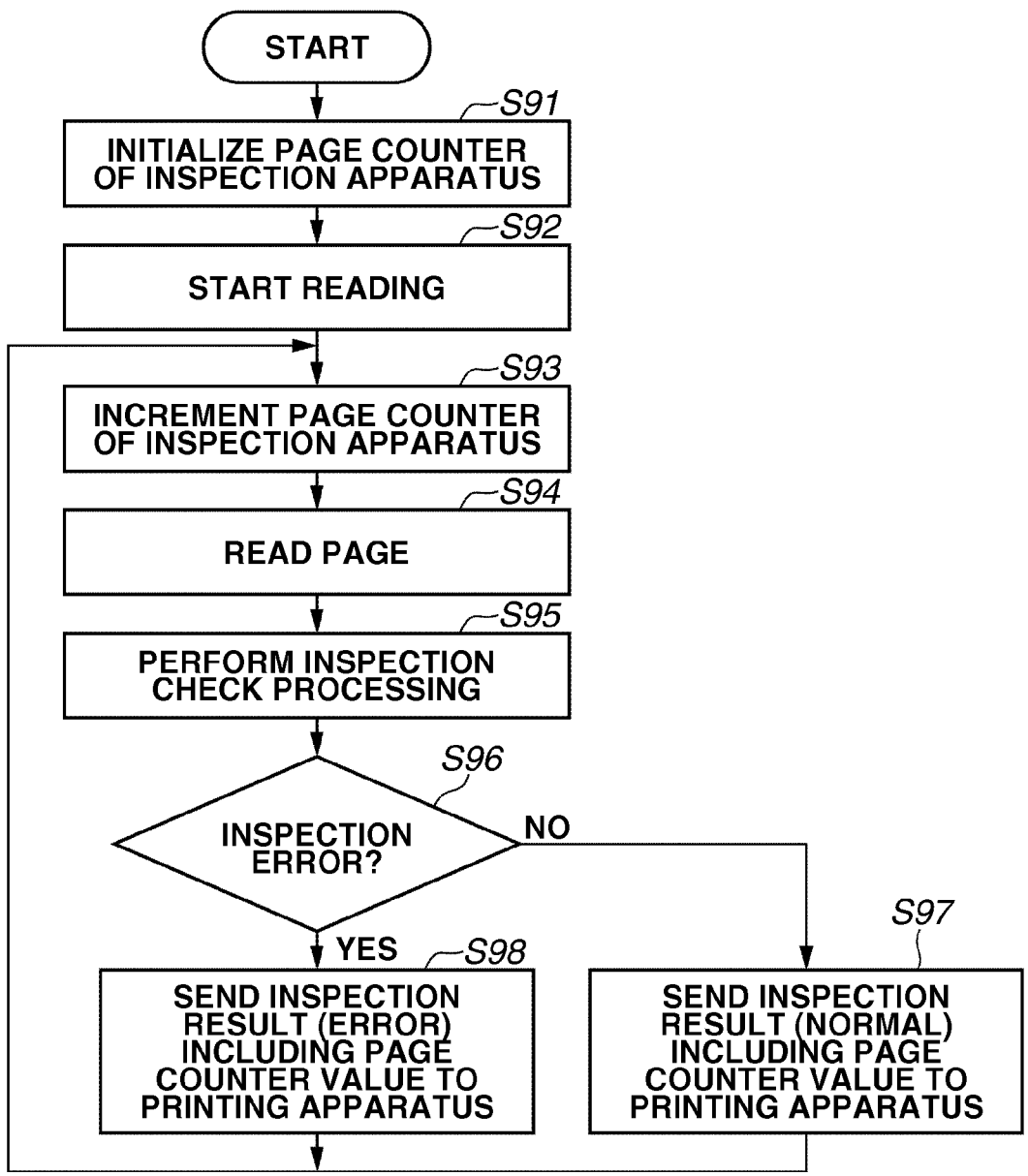
FIG. 12 is a flowchart illustrating a control method for the printing apparatus according to the exemplary embodiment.

FIG. 12 is a flowchart illustrating a control method of the inspection apparatus according to the present exemplary embodiment. More specifically, FIG. 12 illustrates an example of inspection processing that can be performed by the job control unit 1110 of the controller 1100 provided in the inspection apparatus 1002 illustrated in FIG. 3. The job control unit 1110 includes the CPU 1011, the RAM 1012, the program ROM 1013, and the data ROM 1014. The procedure of each step is stored in the program ROM 1013 of the job control unit 1110 so that the CPU 1011 can execute the processing of each step.

An example of the inspection processing is described below with reference to the illustrations in FIG. 1, FIG. 3, and FIG. 5 and the flowchart in FIG. 12. In the present exemplary embodiment, the job control unit 1110 performs the inspection processing on an output result itself. However, the inspection processing can be performed based on a collation with reference to correct data obtainable from the printing apparatus 2 (although not described in below for simplicity).

If the inspection apparatus 1002 starts its operation, then in step S91, the job control unit 1110 initializes the page counter provided on the RAM 1012. The page counter indicates the number of pages processed by the inspection apparatus 1002. If the printing apparatus 2 discharges a print result, then in step S92, the job control unit 1110 causes the scanner engine 1160 to start a scanning operation to inspect the print result of each page, via the scanner control unit 1150.

In step S93, the job control unit 1110 increments the page counter. In step S94, the job control unit 1110 reads an image of the discharged page. Then, in step S95, the job control unit 1110 causes the image processing unit 1140 to check the image to identify the presence of any error. The check processing performed by the job control unit 1110 is based on a comparison with drawing information of the page.

In step S96, the job control unit 1110 determines whether there is any error in the check result. If the check result is normal (NO in step S96), then in step S97, the job control unit 1110 sends a page counter value and an inspection result (normal) to the printing apparatus 2 via the communication processing unit 1130. Then, the processing returns to step S93.

On the other hand, if the job control unit 1110 determines that the check result is error (YES in step S96), then in step S98, the job control unit 1110 sends the page counter value and an inspection result (error) to the printing apparatus 2 via the communication processing unit 1130. Then, the processing returns to step S93. The job control unit 110 repeats the above-described processing unless the inspection apparatus 1002 stops its operation.

Thus, at the time when inspection error information is acquired from the inspection apparatus 1002, the job control unit 1110 can identify the inspection error record from the job information managed by the document management unit 170. Then, if the print processing is already started for a subsequent record at the time when the inspection error information is acquired, the job control unit 1110 continues the currently executed print processing and prevents the print processing from starting for the record to be printed next.

Accordingly, if an inspection error is detected during the processing of a job including a plurality of records to be processed sequentially, the printing of a presently processed record can be accomplished without any interruption and the printing for the next record is stopped. In this case, a user can start a recovery print or, instead of the recovery print, can start print processing for a following record. For example, the user can cancel the print processing for all remaining records in a state where a print result of the inspection error record and an output result of the record having been processed at the timing of an inspection error notice are removed from the paper output destination.

According to the present exemplary embodiment, the print processing can be stopped before starting the processing for any subsequent record if the inspection apparatus 1002 detects an error page while the printing apparatus 2 is performing print processing for a job including a plurality of records.

Further, a user can easily confirm the position of an error page and the presence of normally output records that follow the error page because these data pieces can be displayed on the UI. The user can instruct a recovery print of only the error containing record by pressing the button displayed on the UI screen. If the printing is terminated, an inspection result (normal or error) for the recovery print output can be displayed on the UI screen.

Thus, if the user confirms that the recovery print was successful while viewing the displayed recovery print result, the user can easily extract an error output result that is advanced several records compared to the finally output result, and can replace the extracted result by a recovery printed result. Further, if the recovery print is failed, the user can print the same record repetitively until the error cause is removed completely.

Further, although some pages may be printed uselessly immediately after the inspection apparatus 1002 has detected an occurrence of a print error, it is feasible to prevent papers and toners from being consumed uselessly for any subsequent record because the printing apparatus is controlled not to start the print processing for the next record.

Further, in the present exemplary embodiment, the number of pages included in a single record (e.g., VDP data) is not constant. However, the present invention is applicable to a case where the number of pages included in a single record is constant.

The printing system according to the present exemplary embodiment can identify an output product of a normally printed record and an output product of an inspection error record from the discharged printed product. Thus, the output product of the inspection error record can be surely replaced by the output product of the reprinted record.

According to the above-described exemplary embodiment, it is assumed that the printing apparatus handles a record including several pages, and printing of the next record is stopped upon detecting an error. However, papers and toners may be consumed uselessly if the number of pages included in a record is very large (e.g., 500 pages).

Hence, in a second exemplary embodiment, processing to be performed in response to an occurrence of an inspection error, in a case where a job includes a large number of pages to be processed, is described in detail below. A printing system according to the second exemplary embodiment has hardware and software configurations that are similar to those described in the first exemplary embodiment with reference to FIG. 1 to FIG. 7 and FIG. 9 to FIG. 12. Thus, repeated description will be avoided.

Figure 13:
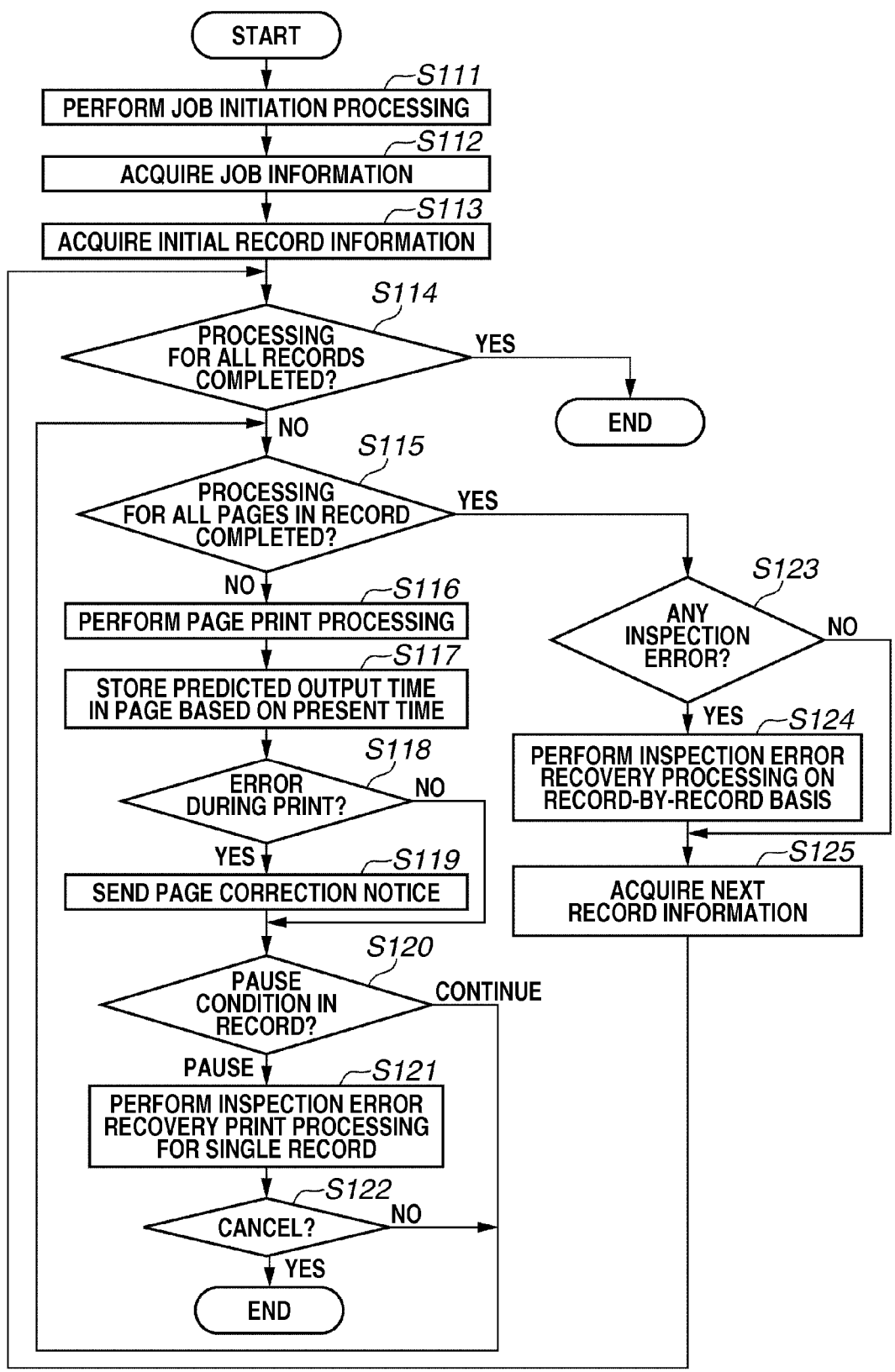
FIG. 13 is a flowchart illustrating a control method for the inspection apparatus according to the exemplary embodiment.

FIG. 13 is a flowchart illustrating a control method of the printing apparatus according to the present exemplary embodiment. More specifically, FIG. 13 illustrates an example job print processing procedure that can be performed by the job control unit 110 of the controller 100 provided in the printing apparatus 2 illustrated in FIG. 1.

An example of the job print processing is described below with reference to the illustrations in FIG. 1, FIG. 2, FIG. 4, and FIG. 6 and the flowchart in FIG. 13. The procedure of each step is stored in the program ROM 13 of the event processing unit 135 so that the CPU 11 can execute the processing of each step. Processing to be performed in step S111 to step S119 is similar to the processing performed in step S11 to step S19 of the flowchart illustrated in FIG. 8 described in the first exemplary embodiment. Thus, repeated description will be avoided.

In step S120, the job control unit 110 checks whether the printing of the page satisfies a pause condition in the record for each page. If the job control unit 110 determines that the printing of the present page satisfies the pause condition in the record (PAUSE in step S120), then in step S121, the job control unit 110 performs inspection error recovery print processing for the present record.

Next, in step S122, the job control unit 110 determines whether a cancellation instruction is received during the inspection error recovery print processing for the present record. If the job control unit 110 determines that the cancellation instruction is received (YES in step S122), the job control unit 110 terminates the processing of the flowchart illustrated in FIG. 13.

On the other hand, if in step S120 the job control unit 110 determines that the printing of the present page satisfies the continuation condition (CONTINUE in step S120), or if the job control unit 110 determines that the cancellation instruction is not received (NO in step S122), the processing returns to step S115 to continue the above-described processing. Processing to be performed in step S123 to step S125 is similar to the processing performed in step S20 to step S22 of the flowchart illustrated in FIG. 8 described in the first exemplary embodiment. Thus, repeated description will be avoided.

Figure 14:
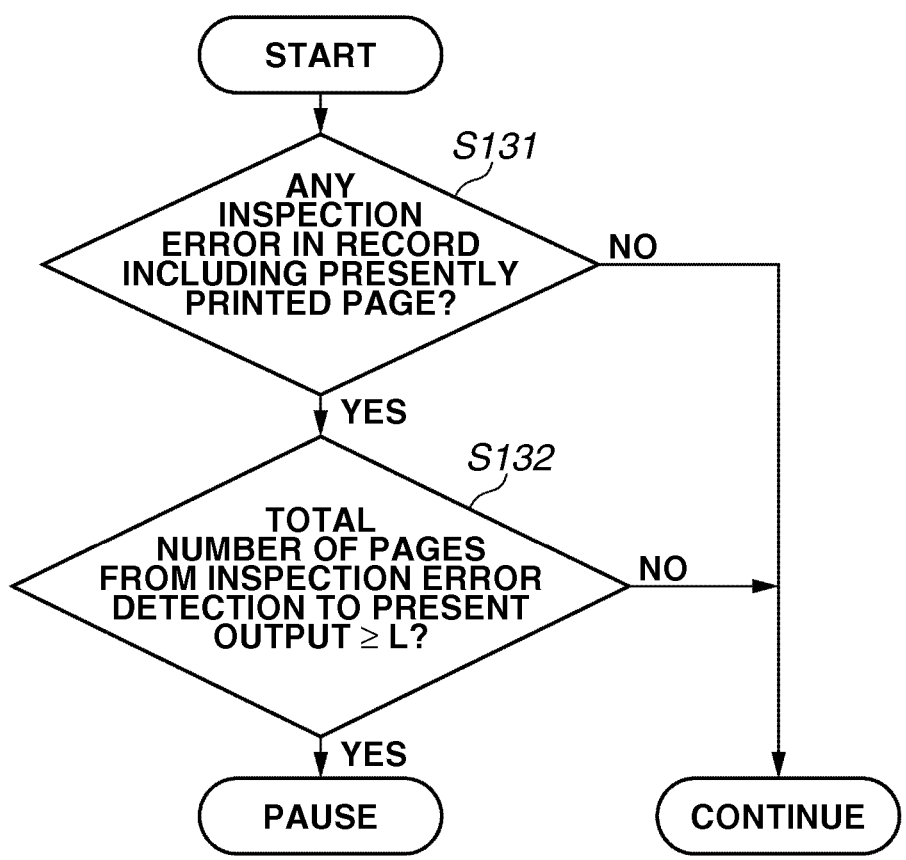
FIG. 14 is a flowchart illustrating a control method for the printing apparatus according to the exemplary embodiment.

FIG. 14 is a flowchart illustrating a control method of the printing apparatus according to the present exemplary embodiment. More specifically, FIG. 14 illustrates an example procedure of in-record pause condition determination processing of the print processing that can be performed by the job control unit 110 of the controller 100 provided in the printing apparatus 2 illustrated in FIG. 1.

An example of the in-record pause condition determination processing is described below in detail with reference to the illustrations in FIG. 1, FIG. 2, FIG. 4, and FIG. 6 and the flowchart in FIG. 14. The procedure of each step is stored in the program ROM 13 of the event processing unit 135 so that the CPU 11 can execute the processing of each step.

First, in step S131, the job control unit 110 determines whether there is any inspection error in a record including a presently printed page, each time the print processing is completed for each page, by checking the content of the page from the beginning thereof.

If the job control unit 110 determines that there is an inspection error page (YES in step S131), then in step S132, the job control unit 110 determines whether the total number of pages from the inspection error detected page to the present output page is greater than a predetermined value L (i.e., threshold L).

If the job control unit 110 determines that the total number of pages from the inspection error detection to the present output is greater than the predetermined value L (threshold L), namely, if the volume of the present record is significantly large and it takes a while to start processing of the next records, the job control unit 110 determines that the job print processing should be stopped.

On the other hand, if there is not any inspection error (NO in step S131), or if the total number of pages from the inspection error detection to the present output is less than the threshold L (NO in step S132), the job control unit 110 determines that the job print processing to be continued. More specifically, if the job control unit 110 determines that the processing for the present record will complete soon, the job control unit 110 determines that the job print processing should be continued. The numerical value of the threshold L used in the present processing can be a fixed value determined beforehand for the printing apparatus 2 or may be a variable value that can be set appropriately by a user, for example, considering the maximum number of pages included in a job to be printed.

Figure 15:
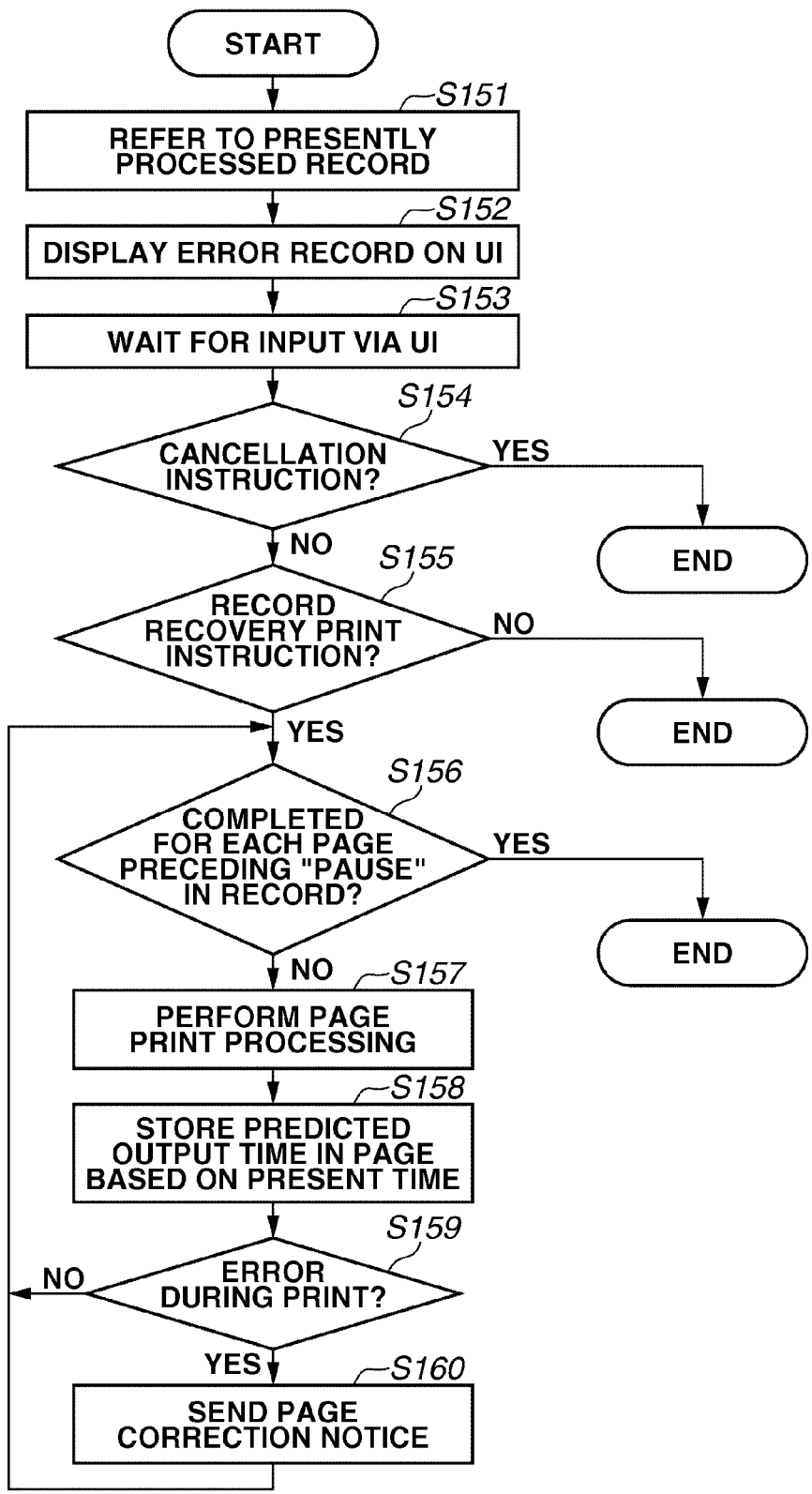
FIG. 15 is a flowchart illustrating a control method for the printing apparatus according to the exemplary embodiment.

FIG. 15 is a flowchart illustrating a control method of the printing apparatus according to the present exemplary embodiment. More specifically, FIG. 15 illustrates a detailed procedure of the inspection error recovery print processing (i.e., the processing to be performed in step S121 illustrated in FIG. 13), which can be performed by the job control unit 110 of the controller 100 provided in the printing apparatus 2 illustrated in FIG. 1, when an inspection error is detected in the present record.

An example of the recovery print processing to be performed in response to an occurrence of an inspection error is described below with reference to the illustrations in FIG. 1, FIG. 2, FIG. 4, FIG. 6, and FIG. 7, and the flowchart illustrated in FIG. 15. The procedure of each step is stored in the program ROM 13 of the job control unit 110 so that the CPU 11 can execute the processing of each step. The inspection error recovery processing to be performed for the present record is described below with reference to the illustrations in FIG. 1, FIG. 2, FIG. 4, and FIG. 6 and the flowchart illustrated in FIG. 15.

In the inspection processing to be performed by the inspection apparatus 1002, which is applied to an image on paper discharged and conveyed from the printing apparatus 2, if the inspection error recovery processing for the present record starts in response to an occurrence of an inspection error, then in step S151, the job control unit 110 refers to the record presently processed in the document management unit 170.

In step S152, the job control unit 110 causes the UI control unit 120 to display information relating to an error-containing record on the UI panel 200. In step S153, the job control unit 110 waits for an instruction input by a user via the UI panel 200.

In step S154, the job control unit 110 determines whether the instruction input by the user is the cancellation instruction. If the job control unit 110 determines that the instruction input by the user is the cancel instruction (YES in step S154), the job control unit 110 terminates the processing of the flowchart illustrated in FIG. 15.

On the other hand, if the job control unit 110 determines that the instruction input by the user is not the cancel instruction (NO in step S154), then in step S155, the job control unit 110 determines whether the instruction input by the user is a record recovery print instruction. If the job control unit 110 determines that the instruction input by the user is not the record recovery print instruction (NO in step S155), for example, if the job control unit 110 determines that the instruction input by the user is a print continuation instruction, the job control unit 110 terminates the processing of the flowchart illustrated in FIG. 15.

On the other hand, if the job control unit 110 determines that the instruction input by the user is the recovery print instruction (YES in step S155), the processing proceeds to step S156 to start the recovery print from the head position of the record.

Then, in step S156, the job control unit 110 determines whether the recovery print processing has been completed for each page preceding the "pause" page in the record. If it is determined that the recovery print processing has been completed for each page preceding the "pause" page in the record (YES in step S156), the job control unit 110 terminates the processing of the flowchart illustrated in FIG. 15.

On the other hand, if the job control unit 110 determines that the recovery print processing is not yet completed for each page preceding the "pause" page in the record (NO in step S156), the processing proceeds to step S157.

In step S157, the job control unit 110 performs page print processing for printing one page of the job, similar to the normal print processing. Next, in step S158, the job control unit 110 stores predicted output time in the page based on the time of the page print processing.

Next, in step S159, the job control unit 110 determines whether an error has occurred during the recovery print processing. If the job control unit 110 determines that there is an error having occurred during the recovery print processing (YES in step S159), then in step S160, the job control unit 110 transmits the page correction notice event to the event processing unit 135. Subsequently, the processing returns to step S156.

On the other hand, if the job control unit 110 determines that there is not any error having occurred during the recovery print processing (NO in step S159), the processing returns to step S156 to process the next page.

If the job control unit 110 determines that the recovery print processing has been completed for each page preceding the "pause" page in the record (YES in step S156), the job control unit 110 terminates the processing of the flowchart illustrated in FIG. 15.

If a record includes many pages, the printing system according to the present exemplary embodiment can stop the print processing even when the printing of an error containing record is not yet completed. Further, in this case, if a user instructs executing the recovery print processing, the printing system performs reprinting and inspection for a plurality of pages ranging from the head page to the stopped page of an inspection error occurrence record.

Then, if no inspection error is detected after the reprint operation, the printing system can resume the print processing for the remaining record after removing the incomplete present record from the output result. On the other hand, if an inspection error is detected again, the user can cancel the job. Further, in the present exemplary embodiment, it is unnecessary to change the recovery processing. In other words, the processing content according to the present exemplary embodiment is compatible with the processing content described in the first exemplary embodiment. Therefore, the processing described in the first exemplary embodiment and the processing described in the second exemplary embodiment can be realized simultaneously by the same system.

In the first and second exemplary embodiments, it is feasible to output the printed product correctly if an inspection error job is reprinted by performing the recovery print processing. However, if many error pages are generated because the original data of a processed job is wrong or because the engine of the printing apparatus 2 is not in a good condition, the recovery print processing may not be stopped immediately as intended.

A printing system according to a third exemplary embodiment can flexibly perform print processing considering the above-described factors, as described in detail below.

The printing system according to the third exemplary embodiment has hardware and software configurations that are similar to those described in the second exemplary embodiment with reference to FIG. 1 to FIG. 7, FIG. 9 to FIG. 13, and FIG. 15. Thus, repeated description will be avoided.

Figure 16:
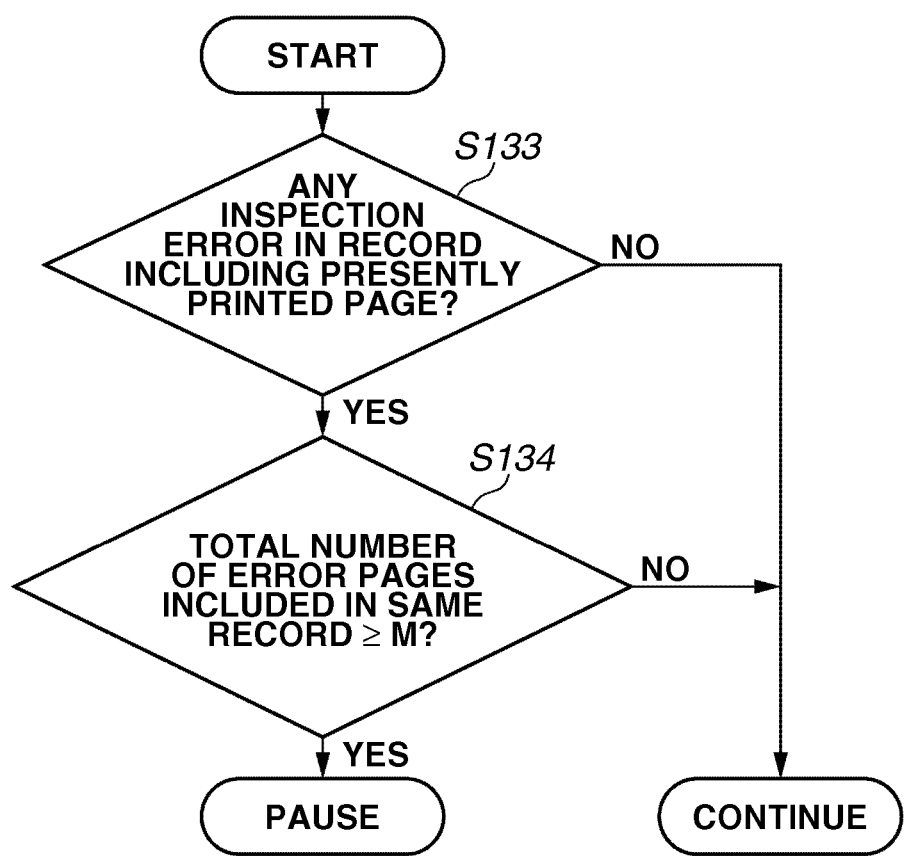
FIG. 16 is a flowchart illustrating a control method for the printing apparatus according to the exemplary embodiment.

FIG. 16 is a flowchart illustrating a control method of the printing apparatus according to the present exemplary embodiment. More specifically, FIG. 16 illustrates an example procedure of in-record pause condition determination processing (i.e., the processing in step S120 illustrated in FIG. 13), of the print processing that can be performed by the job control unit 110 of the controller 100 provided in the printing apparatus 2 illustrated in FIG. 1.

An example of the in-record pause condition determination processing is described with reference to the illustrations in FIG. 1, FIG. 2, FIG. 4, and FIG. 6 and the flowchart in FIG. 16. The procedure of each step is stored in the program ROM 13 of the event processing unit 135 so that the CPU 11 can execute the processing of each step.

First, in step S133, the job control unit 110 determines whether there is any inspection error in a record including a presently printed page, each time the print processing is completed for each page, by checking the content of the page from the beginning thereof.

If the job control unit 110 determines that there is an inspection error page (YES in step S133), the job control unit 110 counts the number of error pages included in the same record. More specifically, in step S134, the job control unit 110 checks whether the number of error pages included in the same record is greater than a predetermined value M.

If the job control unit 110 determines that the number of error pages included in the same record is greater than the predetermined value M (YES in step S134), the job control unit 110 determines that the original data is wrong or the engine of the printing apparatus 2 is not in a good condition. In this case, the job control unit 110 stops the print processing without waiting for the next record.

On the other hand, if there is not any inspection error page (NO in step S133) or if it is determined that the number of error pages is less than the predetermined value M (NO in step S134), the job control unit 110 determines it is desired to perform the recovery print on the record-by-record basis. Thus, the job control unit 110 continues the job print processing. The numerical value M can be a fixed value determined beforehand for the printing apparatus 2 or may be a variable value that can be set appropriately by a user, for example, considering other pause condition.

If it is determined that a record includes a plurality of error pages, the printing system according to the present exemplary embodiment can immediately stop the print processing even if the printing of the record is not yet completed. Thus, a user can stop the recovery print immediately after starting the recovery print.

In the first and second exemplary embodiments, it is feasible to output the printed product correctly if an inspection error job is reprinted by performing the recovery print processing. However, if many error pages are generated because the original data of a processed job is wrong or because the engine of the printing apparatus 2 is not in a good condition, the recovery print processing may not be stopped immediately as intended.

A printing system according to a fourth exemplary embodiment can flexibly perform print processing considering the above-described factors, as described in detail below. The printing system according to the third exemplary embodiment has hardware and software configurations that are similar to those described in the second exemplary embodiment with reference to FIG. 1 to FIG. 7, FIG. 9 to FIG. 13, and FIG. 15. Thus, repeated description will be avoided.

Figure 17:
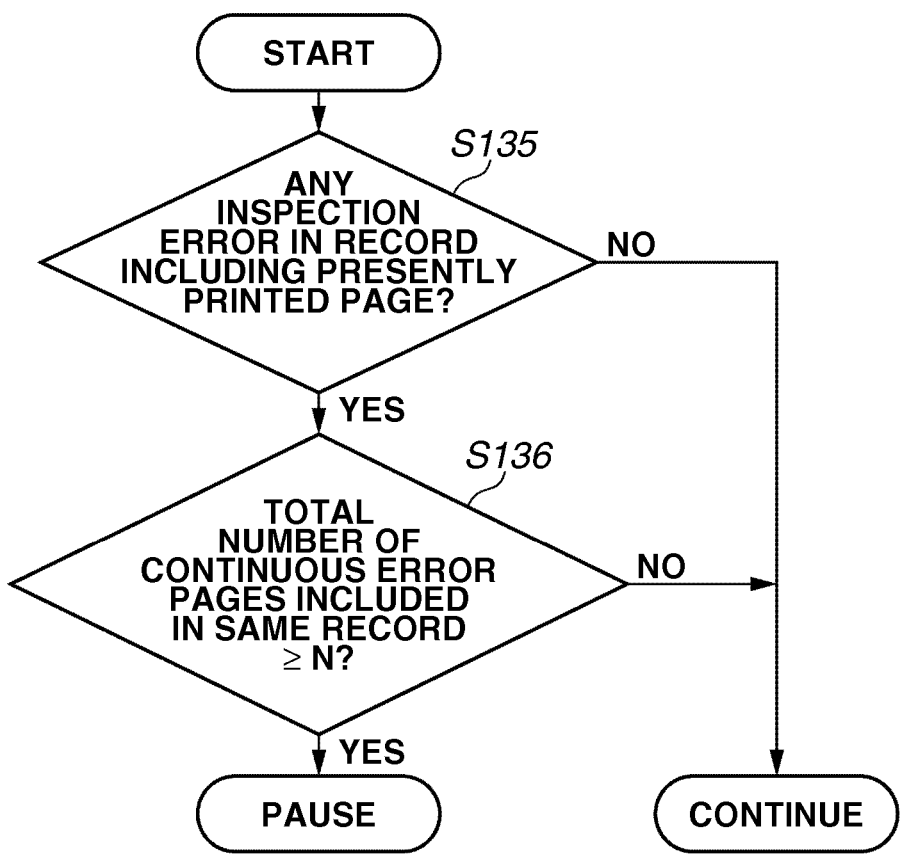
FIG. 17 is a flowchart illustrating a control method for the printing apparatus according to the exemplary embodiment.

FIG. 17 is a flowchart illustrating a control method of the printing apparatus according to the present exemplary embodiment. More specifically, FIG. 17 illustrates an example procedure of in-record pause condition determination processing (i.e., the processing in step S120 illustrated in FIG. 13), of the print processing that can be performed by the job control unit 110 of the controller 100 provided in the printing apparatus 2 illustrated in FIG. 1.

An example of the in-record pause condition determination processing is described below with reference to the illustrations in FIG. 1, FIG. 2, FIG. 4, and FIG. 6 and the flowchart in FIG. 17. The procedure of each step is stored in the program ROM 13 of the event processing unit 135 so that the CPU 11 can execute the processing of each step.

First, in step S135, the job control unit 110 determines whether there is any inspection error in a record including a presently printed page, each time the print processing is completed for each page, by checking the content of the page from the beginning thereof.

If there is an inspection error page (YES in step S135), then in step S136, the job control unit 110 determines whether there are continuous error pages in the same record. More specifically, the job control unit 110 determines whether the total number of the continuous error pages in the same record is equal to or greater than a predetermined value N.

If the total number of the continuous error pages in the same record is equal to or greater than the predetermined value N (YES in step S136), the job control unit 110 determines that the original data is wrong or the engine of the printing apparatus is not in a good condition. In this case, the job control unit 110 stops the print processing without waiting for the next record.

On the other hand, if there is not any inspection error page (NO in step S135), or if it is determined that the total number of the continuous error pages in the same record is less than the predetermined value N (NO in step S136), the job control unit 110 determines that it is desired to perform the recovery print on the record-by-record basis. Thus, the job control unit 110 continues the job print processing. The numerical value M can be a fixed value determined beforehand for the printing apparatus or may be a variable value that can be set appropriately by a user, for example, considering other pause condition Therefore, if it is determined that a record includes sequential error pages, the printing system according to the present exemplary embodiment can stop the presently executed recovery print according to a user instruction, even when the recovery print of the record is not yet completed. Thus, the printing system according to the present exemplary embodiment enables a user to stop the recovery print immediately after starting the recovery print.

To realize each process according to the present invention, a software program can be acquired via a network or an appropriate storage medium and can be executed by a personal computer or any other processing apparatus (e.g., a CPU or a processor).

Further, in the flowchart described in each of the above-described exemplary embodiments, an additional step can be flexibly incorporated and the processing order of each step can be changed appropriately without departing from the scope of the present invention. Further, the contents of the above-described exemplary embodiments or the above-described steps can be combined flexibly without departing from the scope of the present invention.

Further, the present invention is not limited to a printing apparatus that processes the above-described VDP job. For example, the present invention is also applicable to a printing apparatus having a group sort function. In this case, it is needless to say, that an appropriate sheet post-processing apparatus is connected to the printing apparatus.

Further, the printing system according to the above-described exemplary embodiment stops the print processing if error information is included in the inspection result obtained from the inspection apparatus 1002. However, if each job stop method has a unique attribute, the stop method can be dynamically switched with reference to the attribute of the stop method having been set for each job.

Further, the job control unit 110 can perform the following control to replace an already printed page by a reprinted page. More specifically, if the maximum number of pages is instructed by a user or a host computer beforehand for the exchange of jobs, the instructed maximum number of pages is stored in the external memory 30. When error information is acquired from the above-described inspection result, it is useful to stop the print processing before the number of pages included in a record exceeds the instructed maximum number. The printing system according to the present invention can perform reprint processing or continuous print processing in such a way as to reflect an inspection result obtainable from the inspection apparatus on a record-by-record basis.

Further, the printing system according to the present invention can identify an output product of a normally printed record and an output product of an inspection error record from the discharged printed product. Thus, the output product of the inspection error record can be surely replaced by the output product of the reprinted record.

Aspects of the present invention can also be realized by a computer of a system or apparatus (or devices such as a CPU or a MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-038010 filed Feb. 24, 2011, which is hereby incorporated by reference herein in its entirety.

What is claimed is:

1. A printing apparatus capable of processing, as a single job, a plurality of records each including a plurality of pages, the printing apparatus comprising:
   an acquisition unit configured to acquire an inspection result from an inspection apparatus that can inspect a print status by reading an image of paper printed by the printing apparatus;
   a printing unit configured to perform printing of a single record;
   a first determination unit configured to determine whether error information is included in an inspection result of the single record acquired by the acquisition unit from the inspection apparatus, before the printing unit terminates print processing of the single record;
   a second determination unit configured to determine whether a number of pages, of which the inspection result is error, included in the single record is greater than a predetermined value; and
   a job control unit configured to control the printing unit to continue the print processing, if the second determination unit determines that the number of pages, of which the inspection result is error, included in the single record is less than a predetermined value, and further configured to stop the print processing, if the second determination unit determines that the number of pages, of which the inspection result is error, included in the single record are greater than a predetermined value.

2. The printing apparatus according to claim 1, wherein the job control unit is configured to display a print instruction screen that includes record information generated from the inspection result on a display unit, and receive a reprint request for a record selected by a user via the print instruction screen displayed on the display unit.

3. The printing apparatus according to claim 2, wherein the job control unit is configured to receive a continuous print request for a record that follows a print stopped record via the print instruction screen displayed on the display unit.

4. A method for controlling a printing apparatus capable of processing, as a single job, a plurality of records each including a plurality of pages, the method comprising:
   acquiring an inspection result from an inspection apparatus that can inspect a print status by reading an image of paper printed by the printing apparatus;
   performing printing of a single record;
   determining, by a first determination unit, whether error information is included in an inspection result of the single record acquired by the acquisition unit from the inspection apparatus, before the performing step terminates print processing of the single record;
   determining, by a second determination unit, whether a number of pages, of which the inspection result is error, included in the single record is greater than a predetermined value; and
   controlling the performing step to continue the print processing, if the second determination unit determines that the number of pages, of which the inspection result is error, included in the single record is less than a predetermined value, and further configured to stop the print processing, if the second determination unit determines that the number of pages, of which the inspection result is error, included in the single record are greater than a predetermined value.

5. The method according to claim 4, further comprising:
displaying a print instruction screen that includes record information generated from the inspection result on a display unit; and
receiving a reprint request for a record selected by a user via the print instruction screen displayed on the display unit.

6. The method according to claim 5, further comprising receiving a continuous print request for a record that follows a print stopped record via the print instruction screen displayed on the display unit.

7. A non-transitory computer readable storage medium storing a program that causes a computer to control a printing apparatus capable of processing, as a single job, a plurality of records each including a plurality of pages, the program comprising:
acquiring an inspection result from an inspection apparatus that can inspect a print status by reading an image of paper printed by the printing apparatus;
performing printing of a single record;
determining, by a first determination unit, whether error information is included in an inspection result of the single record acquired by the acquisition unit from the inspection apparatus, before the performing step terminates print processing of the single record;
determining, by a second determination unit, whether a number of pages, of which the inspection result is error, included in the single record is greater than a predetermined value; and
controlling the performing step to continue the print processing, if the second determination unit determines that the number of pages, of which the inspection result is error, included in the single record is less than a predetermined value, and further configured to stop the print processing, if the second determination unit determines that the number of pages, of which the inspection result is error, included in the single record are greater than a predetermined value.

8. The storage medium according to claim 7, wherein the program further comprising:
displaying a print instruction screen that includes record information generated from the inspection result on a display unit; and
receiving a reprint request for a record selected by a user via the print instruction screen displayed on the display unit.

9. The storage medium according to claim 8, wherein the program further comprising receiving a continuous print request for a record that follows a print stopped record via the print instruction screen displayed on the display unit.

* * * * *